US012402025B2

United States Patent
He

(10) Patent No.: US 12,402,025 B2
(45) Date of Patent: Aug. 26, 2025

(54) BEAM FAILURE DETECTION MEASUREMENT RELAXATION FOR CELLS WITH MULTIPLE TRANSMISSION RECEPTION POINTS

(71) Applicant: QUALCOMM Incorporated, San Diego, CA (US)

(72) Inventor: Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 407 days.

(21) Appl. No.: 18/163,109

(22) Filed: Feb. 1, 2023

(65) Prior Publication Data

US 2024/0259851 A1  Aug. 1, 2024

(51) Int. Cl.
*H04W 24/10* (2009.01)
*H04L 5/00* (2006.01)

(52) U.S. Cl.
CPC ........... *H04W 24/10* (2013.01); *H04L 5/0051* (2013.01)

(58) Field of Classification Search
CPC ............. H04W 24/10; H04W 36/0088; H04W 36/085; H04W 36/0094; H04W 36/0058; H04L 5/0051; H04B 7/0695; H04B 7/088
See application file for complete search history.

(56) References Cited

U.S. PATENT DOCUMENTS

| 2022/0225121 A1 | 7/2022 | Wanuga et al. | |
| 2022/0302983 A1* | 9/2022 | Zhou | H04B 7/0695 |

(Continued)

FOREIGN PATENT DOCUMENTS

| WO | 2021254590 A1 | 12/2021 |
| WO | 2022011530 A1 | 1/2022 |
| WO | 2024025449 A1 | 2/2024 |

OTHER PUBLICATIONS

Fujitsu: "BFD relaxation for serving cell with mTRP", 3GPP TSG-RAN WG2 Meeting #120, R2-2211843, 3rd Generation Partnership Project (3GPP), Mobile Competence Centre, 650, Route Des Lucioles, F-06921 Sophia-Antipolis Cedex, France, vol. 3GPP RAN 2, No. Toulouse, FR, Nov. 14, 2022-Nov. 18, 2022, Nov. 4, 2022, 2 Pages, XP052215936, paragraph [002.].

(Continued)

*Primary Examiner* — Chuong A Ngo
(74) *Attorney, Agent, or Firm* — Holland & Hart LLP/Qualcomm Incorporated

(57) ABSTRACT

Methods, systems, and devices for wireless communications are described. In some examples, a user equipment (UE) may receive a control message indicating one or more parameters for measuring multiple reference signals. The one or more parameters may be associated with adjusting one or more measurement periodicities. The UE may measure respective channel quality metrics for the multiple reference signals, where the multiple reference signals includes a first set of reference signals associated with a first transmission reception point. The UE may adjust a measurement periodicity for the first set of reference signals according to a first parameter of the one or more parameters based on a first channel quality metric associated with the first set of reference signals, where the measurement periodicity for the first set of reference signals is separately adjustable relative to a measurement periodicity for the second set of reference.

20 Claims, 14 Drawing Sheets

(56) References Cited

U.S. PATENT DOCUMENTS

2023/0019889 A1   1/2023  He
2024/0214838 A1*  6/2024  Shen .................... H04W 72/53

OTHER PUBLICATIONS

International Search Report and Written Opinion—PCT/US2023/085129—ISA/EPO—Apr. 8, 2024 (2302136WO).
Vivo: "Report of [AT118-e][003][ePowSav] RLM and BFD relaxation (vivo)", 3GPP TSG-RAN WG2 Meeting #119-e, R2-2209003, 3rd Generation Partnership Project (3GPP), Mobile Competence Centre, 650, Route Des Lucioles, F-06921 Sophia-Antipolis Cedex, France, vol. RAN WG2, No. Electronic, Aug. 17, 2022-Aug. 26, 2022, Sep. 3, 2022, 26 Pages, XP052262263, paragraph [03.2].

* cited by examiner

BEAM FAILURE DETECTION MEASUREMENT RELAXATION FOR CELLS WITH MULTIPLE TRANSMISSION RECEPTION POINTS

FIELD OF TECHNOLOGY

The following relates to wireless communications, including beam failure detection (BFD) measurement relaxation for cells with multiple transmission reception points (TRPs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support beam failure detection (BFD) measurement relaxation for cells with multiple transmission reception points (TRPs). Generally, the techniques described herein may enable a user equipment (UE), associated with multiple TRPs of a cell, to adjust a measurement periodicity for at least a first set of reference signals from a plurality of reference signals associated with the multiple TRPs. For example, the UE may receive a control message indicative of one or more parameters associated with measuring the multiple reference signals, where the one or more parameters are associated with one or more measurement periodicities associated with the multiple reference signals. Additionally, the UE may measure respective channel quality metrics fort the multiple reference signals, where the multiple reference signals includes the first set of reference signals associated with a first TRP of the cell and a second set of reference signals associated with a second TRP of the cell. The UE may adjust a measurement periodicity for the first set of reference signals according to a first parameter of the one or more parameters based on a first channel quality metric associated with the first set of reference signals. The measurement periodicity for the first set of reference signals may be separately adjustable relative to a measurement periodicity for the second set of reference signals. As such, the UE may maintain the measurement periodicity for the second set of reference signals or may adjust the measurement periodicity for the second set of reference signals based on a second channel quality metric associated with the second set of reference signals.

A method for wireless communications at a UE is described. The method may include receiving a control message indicative of one or more parameters associated with measuring a set of multiple reference signals, where the one or more parameters are associated with adjusting one or more measurement periodicities associated with the set of multiple reference signals, measuring respective channel quality metrics for the set of multiple reference signals, where the set of multiple reference signals includes a first set of reference signals associated with a first TRP of a cell and a second set of reference signals associated with a second TRP of the cell, and adjusting a measurement periodicity for the first set of reference signals according to a first parameter of the one or more parameters based on a first channel quality metric associated with the first set of reference signals, where the measurement periodicity for the first set of reference signals is separately adjustable relative to a measurement periodicity for the second set of reference signals.

An apparatus for wireless communications is described. The apparatus may include a memory, a transceiver, and at least one processor of a UE, the at least one processor coupled with the memory and the transceiver. The at least one processor may be configured to cause the apparatus to receive, via the transceiver, a control message indicative of one or more parameters associated with measuring a set of multiple reference signals, where the one or more parameters are associated with adjusting one or more measurement periodicities associated with the set of multiple reference signals, measure respective channel quality metrics for the set of multiple reference signals, where the set of multiple reference signals includes a first set of reference signals associated with a first TRP of a cell and a second set of reference signals associated with a second TRP of the cell, and adjust a measurement periodicity for the first set of reference signals according to a first parameter of the one or more parameters based on a first channel quality metric associated with the first set of reference signals, where the measurement periodicity for the first set of reference signals is separately adjustable relative to a measurement periodicity for the second set of reference signals.

Another apparatus for wireless communications at a UE is described. The apparatus may include means for receiving a control message indicative of one or more parameters associated with measuring a set of multiple reference signals, where the one or more parameters are associated with adjusting one or more measurement periodicities associated with the set of multiple reference signals, means for measuring respective channel quality metrics for the set of multiple reference signals, where the set of multiple reference signals includes a first set of reference signals associated with a first TRP of a cell and a second set of reference signals associated with a second TRP of the cell, and means for adjusting a measurement periodicity for the first set of reference signals according to a first parameter of the one or more parameters based on a first channel quality metric associated with the first set of reference signals, where the measurement periodicity for the first set of reference signals is separately adjustable relative to a measurement periodicity for the second set of reference signals.

A non-transitory computer-readable medium storing code for wireless communications at a UE is described. The code may include instructions executable by a processor to receive a control message indicative of one or more parameters associated with measuring a set of multiple reference signals, where the one or more parameters are associated with adjusting one or more measurement periodicities associated with the set of multiple reference signals, measure respective channel quality metrics for the set of multiple reference signals, where the set of multiple reference signals includes a first set of reference signals associated with a first TRP of a cell and a second set of reference signals associated with a second TRP of the cell, and adjust a measurement periodicity for the first set of reference signals according to a first parameter of the one or more parameters based on a first channel quality metric associated with the first set of reference signals, where the measurement periodicity for the first set of reference signals is separately adjustable relative to a measurement periodicity for the second set of reference signals.

In some examples of the method, apparatuses, and non-transitory computer-readable medium described herein, adjusting the measurement periodicity for the first set of reference signals may include operations, features, means, or instructions for adjusting a time gap between successive measurements for the first set of reference signals based on a first SINR ratio associated with the first set of reference signals exceeding a first threshold.

In some examples of the method, apparatuses, and non-transitory computer-readable medium described herein, the control message indicates the first threshold associated with the first set of reference signals and a second threshold associated with the second set of reference signals.

In some examples of the method, apparatuses, and non-transitory computer-readable medium described herein, the first threshold and the second threshold may be the same based on the first TRP and the second TRP being associated with the cell.

In some examples of the method, apparatuses, and non-transitory computer-readable medium described herein, the first threshold and the second threshold may be different based on the first TRP being associated with the first set of reference signals and the second TRP being associated with the second set of reference signals.

Some examples of the method, apparatuses, and non-transitory computer-readable medium described herein may further include operations, features, means, or instructions for maintaining the measurement periodicity for the second set of reference signals based on a second channel quality metric associated with the second set of reference signals failing to exceed a threshold.

Some examples of the method, apparatuses, and non-transitory computer-readable medium described herein may further include operations, features, means, or instructions for maintaining the measurement periodicity for the second set of reference signals may be based on a SINR ratio associated with the second set of reference signals failing to exceed a threshold and the second channel quality metric may be the SINR ratio.

Some examples of the method, apparatuses, and non-transitory computer-readable medium described herein may further include operations, features, means, or instructions for adjusting the measurement periodicity for the second set of reference signals according to a second parameter of the one or more parameters based on a second channel quality metric associated with the second set of reference signals.

In some examples of the method, apparatuses, and non-transitory computer-readable medium described herein, the first parameter and the second parameter may be the same based on the first TRP and the second TRP being associated with the cell.

In some examples of the method, apparatuses, and non-transitory computer-readable medium described herein, the first parameter and the second parameter may be different based on the first TRP being associated with the first set of reference signals and the second TRP being associated with the second set of reference signals.

Some examples of the method, apparatuses, and non-transitory computer-readable medium described herein may further include operations, features, means, or instructions for adjusting the measurement periodicity for the second set of reference signals may be based on a SINR ratio associated with the second set of reference signals exceeding a threshold and the second channel quality metric may be the SINR ratio.

Some examples of the method, apparatuses, and non-transitory computer-readable medium described herein may further include operations, features, means, or instructions for transmitting a report indicating the adjustment of the measurement periodicity for the first set of reference signals, where the report includes an indication of a first CORESET identifier associated with the first TRP of the cell.

In some examples of the method, apparatuses, and non-transitory computer-readable medium described herein, the report further indicates an adjustment of the measurement periodicity for the second set of reference signals and the report includes an indication of a second CORESET identifier associated with the second TRP of the cell.

In some examples of the method, apparatuses, and non-transitory computer-readable medium described herein, the report may be transmitted via UE assistance information.

Some examples of the method, apparatuses, and non-transitory computer-readable medium described herein may further include operations, features, means, or instructions for determining a mobility metric associated with the UE, where adjusting the measurement periodicity for the first set of reference signals may be based on the mobility metric associated with the UE being associated with a low mobility scenario.

In some examples of the method, apparatuses, and non-transitory computer-readable medium described herein, the mobility metric may be associated with the first TRP and the second TRP based on the first TRP and the second TRP being associated with the cell.

Some examples of the method, apparatuses, and non-transitory computer-readable medium described herein may further include operations, features, means, or instructions for receiving a second control message indicative of a set of multiple CORESET identifiers, where each CORESET identifier may be associated with a respective TRP of the cell.

Some examples of the method, apparatuses, and non-transitory computer-readable medium described herein may further include operations, features, means, or instructions for adjusting the measurement periodicity for the first set of reference signals includes increasing a time gap between successive measurements of the first set of reference signals based on the first parameter.

A method for wireless communications at a network entity is described. The method may include transmitting a first control message indicative of a set of multiple CORESET identifiers, where each CORESET identifier is associated with a respective TRP of a cell, transmitting a second control message indicative of one or more parameters associated with adjusting one or more measurement periodicities associated with measurements of a set of multiple reference signals by a UE, where the set of multiple reference signals includes a first set of reference signals associated with a first TRP of the cell and a second set of reference signals associated with a second TRP of the cell, and receiving a report indicative of an adjustment, by the UE, of a measurement periodicity for the first set of reference signals according to a first parameter of the one or more parameters, where the measurement periodicity for the first set of reference signals is separately adjustable relative to a measurement periodicity for the second set of reference signals.

An apparatus for wireless communications at is described. The apparatus may include a memory and at least one processor of a network entity, the at least one processor coupled with the memory. The at least one processor may be configured to cause the apparatus to transmit a first control message indicative of a set of multiple CORESET identifiers, where each CORESET identifier is associated with a respective TRP of a cell, transmit a second control message indicative of one or more parameters associated with adjusting one or more measurement periodicities associated with measurements of a set of multiple reference signals by a UE, where the set of multiple reference signals includes a first set of reference signals associated with a first TRP of the cell and a second set of reference signals associated with a second TRP of the cell, and receive a report indicative of an adjustment, by the UE, of a measurement periodicity for the first set of reference signals according to a first parameter of the one or more parameters, where the measurement periodicity for the first set of reference signals is separately adjustable relative to a measurement periodicity for the second set of reference signals.

Another apparatus for wireless communications at a network entity is described. The apparatus may include means for transmitting a first control message indicative of a set of multiple CORESET identifiers, where each CORESET identifier is associated with a respective TRP of a cell, means for transmitting a second control message indicative of one or more parameters associated with adjusting one or more measurement periodicities associated with measurements of a set of multiple reference signals by a UE, where the set of multiple reference signals includes a first set of reference signals associated with a first TRP of the cell and a second set of reference signals associated with a second TRP of the cell, and means for receiving a report indicative of an adjustment, by the UE, of a measurement periodicity for the first set of reference signals according to a first parameter of the one or more parameters, where the measurement periodicity for the first set of reference signals is separately adjustable relative to a measurement periodicity for the second set of reference signals.

A non-transitory computer-readable medium storing code for wireless communications at a network entity is described. The code may include instructions executable by a processor to transmit a first control message indicative of a set of multiple CORESET identifiers, where each CORESET identifier is associated with a respective TRP of a cell, transmit a second control message indicative of one or more parameters associated with adjusting one or more measurement periodicities associated with measurements of a set of multiple reference signals by a UE, where the set of multiple reference signals includes a first set of reference signals associated with a first TRP of the cell and a second set of reference signals associated with a second TRP of the cell, and receive a report indicative of an adjustment, by the UE, of a measurement periodicity for the first set of reference signals according to a first parameter of the one or more parameters, where the measurement periodicity for the first set of reference signals is separately adjustable relative to a measurement periodicity for the second set of reference signals.

In some examples of the method, apparatuses, and non-transitory computer-readable medium described herein, first control message indicates one or more thresholds associated with channel quality metrics for the set of multiple reference signals, including a first threshold associated with the first set of reference signals and a second channel quality threshold associated with the second set of reference signals.

In some examples of the method, apparatuses, and non-transitory computer-readable medium described herein, the first threshold and the second threshold may be the same based on the first TRP and the second TRP being associated with the cell.

In some examples of the method, apparatuses, and non-transitory computer-readable medium described herein, the first threshold and the second threshold may be different based on the first TRP being associated with the first set of reference signals and the second TRP being associated with the second set of reference signals.

In some examples of the method, apparatuses, and non-transitory computer-readable medium described herein, the report includes an indication of a CORESET identifier of the set of multiple CORESET identifiers and the CORESET identifier may be associated with the first TRP of the cell.

In some examples of the method, apparatuses, and non-transitory computer-readable medium described herein, the report further indicates an adjustment, by the UE, of the measurement periodicity for the second set of reference signals according to a second parameter of the one or more parameters and the report includes an indication of a CORESET identifier associated with the second TRP of the cell.

In some examples of the method, apparatuses, and non-transitory computer-readable medium described herein, the first parameter and the second parameter may be the same based on the first TRP and the second TRP being associated with the cell.

In some examples of the method, apparatuses, and non-transitory computer-readable medium described herein, the first parameter and the second parameter may be different based on the first TRP being associated with the first set of reference signals and the second TRP being associated with the second set of reference signals.

In some examples of the method, apparatuses, and non-transitory computer-readable medium described herein, the report may be received via UE assistance information.

DETAILED DESCRIPTION

Figure 1:
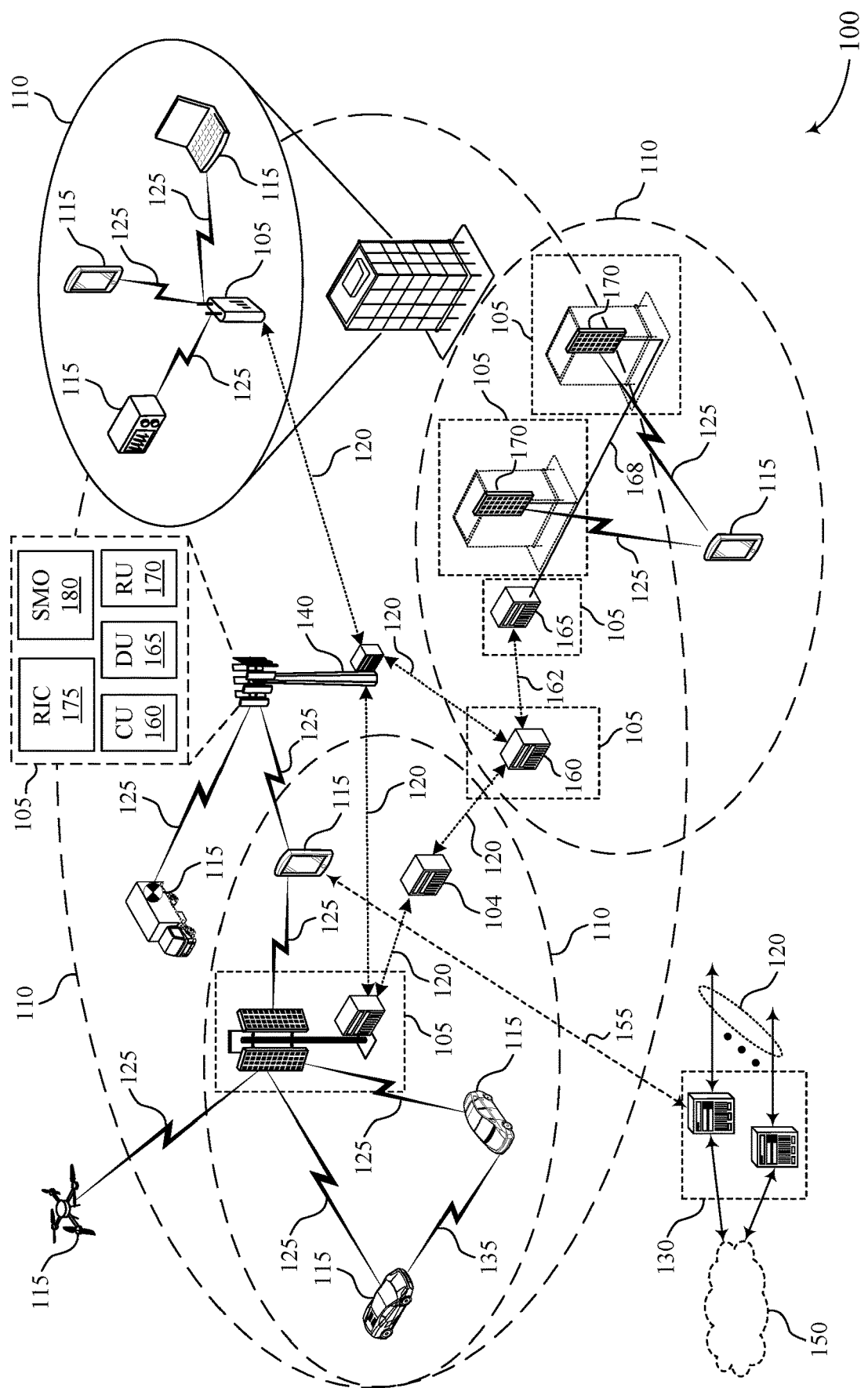
FIG. 1 illustrates an example of a wireless communications system that supports beam failure detection (BFD) measurement relaxation for cells with multiple transmission reception points (TRPs) in accordance with one or more aspects of the present disclosure.

Some wireless communications systems may support beam failure detection (BFD). For example, a user equipment (UE) may periodically monitor one or more reference signals associated with a network entity (e.g., serving cell) to detect beam failure. In some examples, the UE may be in a low-mobility scenario and respective channel quality metrics associated with the one or more reference signals may exceed a threshold. In such cases, the UE may increase the periodicity at which the UE monitors the one or more reference signals associated with the network entity for BFD. In other words, the UE may measure the one or more reference signals less often, such as by increasing a time gap between measuring the one or more reference signals, which may be referred to BFD measurement relaxation In some cases, the network entity may be associated with multiple transmission reception points (TRPs), and each TRP may be associated with one or more reference signals, which may be referred to as reference signal sets. For example, the multiple TRPs may include a first TRP associated with a first reference signal set and a second TRP associated with a second reference signal set. In such cases, the UE may measure channel quality metrics of each reference signal of the first reference signal set and the second reference signal set to determine whether the UE may perform BFD measurement relaxation. That is, the UE may be in a low mobility scenario and a channel quality metric associated with the first reference signal set may exceed the threshold while a channel quality metric associated with the second reference signal set may fail to exceed the threshold. In such cases, the UE may refrain from adjusting a measurement periodicity of the first reference signal set and a measurement periodicity of the second reference signal set based on the channel quality metric associated with the second reference signal set failing to exceed the threshold (e.g., despite the channel quality metric associated with the first reference signal set exceeding the threshold), resulting in inefficient power consumption and resource utilization.

Accordingly, techniques described herein may support per-TRP BFD measurement relaxation. In such cases, a UE may receive control signaling indicating one or more parameters associated with adjusting a measurement periodicity of multiple reference signal sets, the multiple reference signal sets including a first reference signal set associated with a first TRP of a cell and a second reference signal ser associated with a second TRP of the cell. The one or more parameters may include a first threshold and a first relaxation factor associated with the first reference signal set and a second threshold and second relaxation threshold associated with the second reference signal set. As such, the UE may measure channel quality metrics of each reference signal set and may adjust a measurement periodicity of the first references signal set, a measurement periodicity of the second reference signal set, or both, based on respective channel quality metrics. For example, the UE may adjust the measurement periodicity of the first references signal set according to the first relaxation factor based on a first channel quality metric associated with the first references signal set exceeding the threshold. Conversely, the UE may maintain the measurement periodicity of the second reference signal set based on a second channel quality metric associated with the second reference signal set failing to exceed the second threshold.

Thus, for example, for a multi-TRP cell, one or more criteria (e.g., signal quality criteria, mobility criteria, or both) associated with relaxation of the periodicity with which BFD-related measurements are performed may be evaluated on a per-TRP basis (e.g., rather than on a cell-wide basis). Evaluating such criteria on a per-TRP basis may beneficially allow relaxation of the periodicity of BFD measurements for any TRP for which the associated criteria are met, even if one or more other TRPs of the same cell do not qualify for relaxation, thereby enhancing power savings, among other potential benefits.

Aspects of the disclosure are initially described in the context of wireless communications systems. Aspects of the disclosure are then described in the context of a process flow. Aspects of the disclosure are further illustrated by and described with reference to apparatus diagrams, system diagrams, and flowcharts that relate to BFD measurement relaxation for cells with multiple TRPs.

FIG. 1 illustrates an example of a wireless communications system 100 that supports BFD measurement relaxation for cells with multiple TRPs in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a TRP (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support BFD measurement relaxation for cells with multiple TRPs as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a CORESET (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may support per-TRP BFD measurement relaxation. In such cases, a UE 115 may receive control signaling indicating one or more parameters associated with adjusting a measurement periodicity of multiple reference signal sets, the multiple reference signal sets including a first reference signal set associated with a first TRP of a network entity 105 (e.g., serving cell) and a second reference signal ser associated with a second TRP of the network entity 105. The one or more parameters may include a first threshold and a first relaxation factor associated with the first reference signal set and a second threshold and second relaxation threshold associated with the second reference signal set. In some examples, the first threshold and the second threshold may be the same. Additionally, or alternatively, the first relaxation parameter and the second relaxation parameter may be the same.

As such, the UE 115 may measure channel quality metrics of each reference signal set and may adjust a measurement periodicity of the first references signal set, a measurement periodicity of the second reference signal set, or both, based on respective channel quality metrics. For example, the UE 115 may adjust the measurement periodicity of the first references signal set according to the first relaxation factor based on a first channel quality metric associated with the first references signal set exceeding the threshold. Conversely, the UE 115 may maintain the measurement periodicity of the second reference signal set based on a second channel quality metric associated with the second reference signal set failing to exceed the second threshold.

Figure 2:
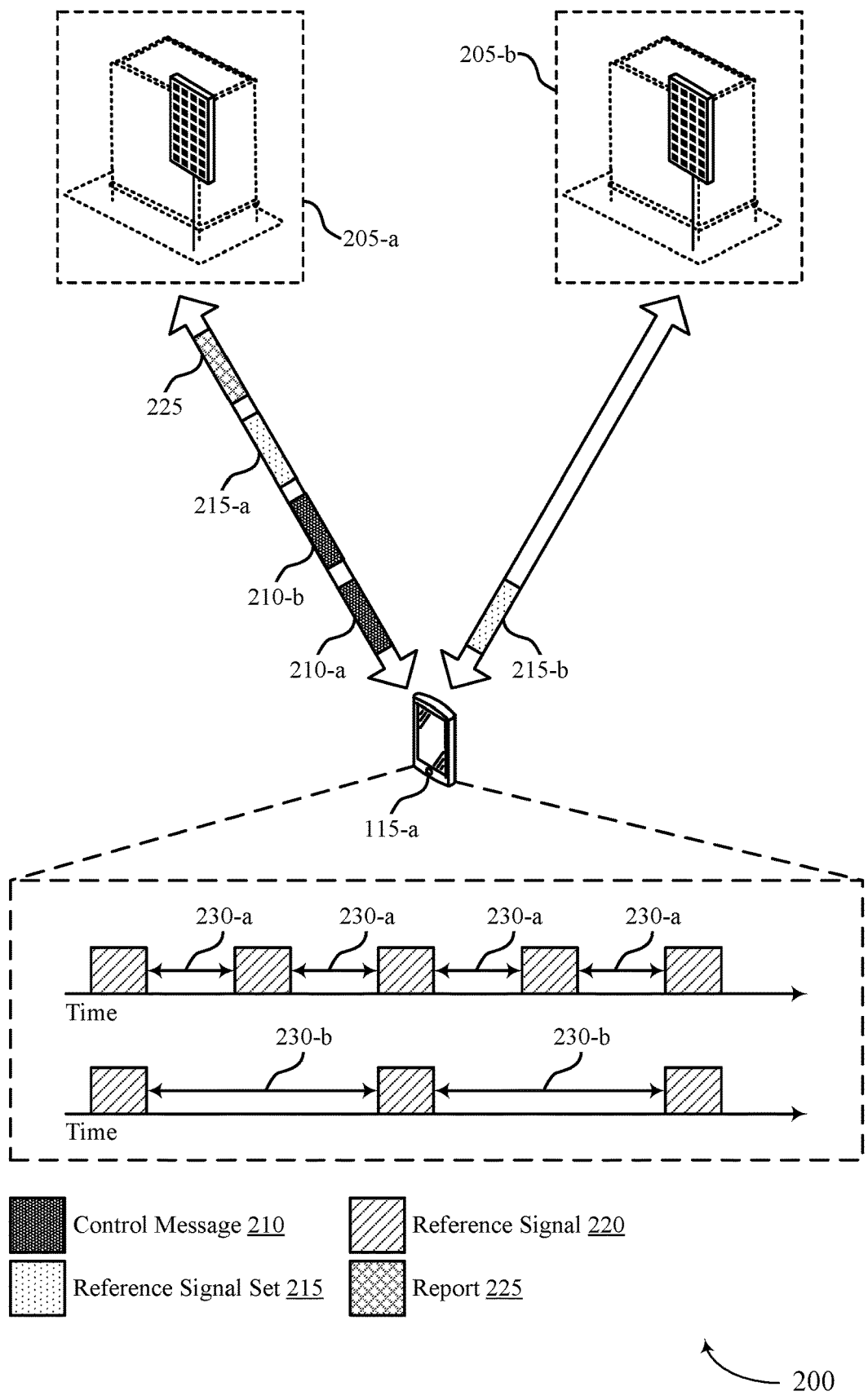
FIG. 2 illustrates an example of a wireless communications system that supports BFD measurement relaxation for cells with multiple TRPs in accordance with one or more aspects of the present disclosure.

FIG. 2 illustrates an example of a wireless communications system 200 that supports BFD measurement relaxation for cells with multiple TRPs in accordance with one or more aspects of the present disclosure. The wireless communications system 200 may implement or be implemented by aspects of the wireless communication system 100. For example, the wireless communications system 200 may include one or more network entities 105 (e.g., a network entity 105 associated with a TRP 205-a and a TRP 205-b) and one or more UEs 115 (e.g., a UE 115-a), which may represent examples of corresponding devices as described with reference to FIG. 1. In some examples, the UE 115-a may adjust a measurement periodicity for a first set of reference signals associated with the TRP 205-a, a second set of reference signals associated with the TRP 205-b, or both.

Some wireless communications systems, such as the wireless communications system 200, may support BFD. For example, a UE 115, such as the UE 115-a, may periodically monitor one or more reference signals 220 associated with a network entity 105 (e.g., serving cell, SpCell) to detect beam failure. In some examples, the UE 115-a may be in a low-mobility scenario (e.g., the UE 115-a may satisfy low mobility criterion) and channel quality metrics associated with the one or more reference signals 220 may exceed a threshold (e.g., the one or more reference signals 220 may satisfy serving cell quality criterion). That is, the UE 115-a may evaluate (e.g., measure) the one or more reference signals 220 (e.g., downlink reference signals (DL-RS)) associated with the network entity 105 (e.g., using an algorithm) to determine that the UE 115-a is operating in a low mobility scenario (e.g., the UE 115-a satisfies low mobility criterion for radio resource management (RRM) relaxation). Additionally, the UE 115-a may measure a signal to interference and noise (SINR) of the one or more reference signals 220 and compare the SINRs to the threshold to determine whether the SINRs associated with the one or more references signals 220 exceed the threshold (e.g., are higher than the threshold, $Q_{in}$, by a configured offset, $Q_x$).

In such cases (the UE 115-a satisfies the low mobility criterion and the one or more reference signals 220 satisfy the serving cell quality criterion), the UE 115-a may increase the periodicity at which the UE 115-a monitors the one or more reference signals 220 associated with the network entity 105 for BFD (e.g., apply a longer measurement periodicity). In other words, the UE 115-a may increase a time gap 230 between measuring the one or more reference signals 220, which may be referred to BFD measurement relaxation In some cases, the network entity 105 may be associated with multiple transmission reception points (TRPs) 205 and each TRP 205 may be associated with one or more reference signals 220 (e.g., BFD-RSs), which may be referred to as reference signal sets 215 (e.g., BFD-RS set). In such cases, each reference signal set 215 may be associated with a set of BFD parameters (e.g., BFD parameters are configured independently for each reference signal set 215). For example, the multiple TRPs may include a TRP 205-a associated with a reference signal set 215-a and a TRP 205-b associated with a reference signal set 215-b. In such cases, the UE 115-a may evaluate BFD for the network entity 105 based on each reference signal set 215. That is, the UE 115-a may determine that BFD has not occurred (e.g., the network entity 105 fulfills or satisfies good serving cell quality criterion) based on a reference signal 220 (e.g., resource associated with the reference signal 220) from the reference signal set 215-a, a reference signal 220 from the reference signal set 215-b, or both, satisfying a threshold (e.g., the good serving cell criterion is fulfilled as long as any references signal 220 associated with the network entity 105 fulfills the good serving cell criterion, or satisfied the threshold, regardless of which reference signal set 215 the reference signal 220 is associated with).

Additionally, the UE 115-a may perform BFD measurement relaxation for the network entity 105 associated with the multiple TRPs 205. In such cases, the UE 115-a may measure channel quality metrics of each reference signal 220 of the first reference signal set 215-a and each reference signal 220 of the reference signal set 215-b to determine whether the UE 115-a may adjust a measurement periodicity of the first reference signal set 215-a and the reference signal set 215-b. For example, the UE 115-a may be in a low mobility scenario and a channel quality metric associated with the first reference signal set 215-a may exceed a threshold while a channel quality metric associated with the reference signal set 215-b may fail to exceed the threshold. In such cases, the UE 115-a may refrain from adjusting the measurement periodicity of the first reference signal set 215-a and the measurement periodicity of the reference signal set 215-b based on the channel quality metric associated with the reference signal set 215-b failing to exceed the threshold (e.g., despite the channel quality metric associated with the first reference signal set 215-a exceeding the threshold). In other words, the UE 115-a adjusting the measurement periodicity of the first reference signal set 215-a and the measurement periodicity of the reference signal set 215-b based on the channel quality metrics associated with each reference signal set 215 satisfying the threshold (e.g., BFD measurement relaxation is performed per cell), resulting in inefficient power consumption and resource utilization.

Accordingly, techniques described herein may support per-TRP 205 BFD measurement relaxation. For example, the UE 115-a may receive a control message 210-a indicating multiple TRPs 205 of a network entity 105, including a TRP 205-a and a TRP 205-b (e.g., may configure the UE 115-a for multi-TRP communications). For example, the control message 210-a may indicate a first control resource set (COREST) identifier associated with the TRP 205-a and a second CORESET identifier associated with the TRP 205-b. Additionally, each TRP 205 may be associated with one or more reference signals 220, which may be referred to as reference signal sets 215. For example, the TRP 205-a may be associated with a reference signal set 215-a and the TRP 205-b may be associated with a reference signal set 215-b. The UE 115-a may receive the control message 210-a from the TRP 205-a (e.g., depicted), the TRP 205-b, or both.

Additionally, the UE 115-a may receive a control message 210-b indicating one or more parameters associated with measuring the multiple reference signals 220 associated with the multiple reference signal sets 215, including the reference signal set 215-a associated with the TRP 205-a of the network entity 105 and the reference signal set 215-b associated with the TRP 205-b of the network entity 105. The one or more parameters may be associated with adjusting a measurement periodicity of each reference signal set 215. For example, the one or more parameters may include a first threshold (e.g., a first $Q_x$, a first offset from $Q_{in}$) and a first relaxation factor associated with the reference signal set 215-a (e.g., associated with the TRP 205-a) and a second threshold (e.g., a second $Q_x$, a second offset from $Q_{in}$) and a second relaxation factor associated with the reference signal set 215-b (e.g., associated with the TRP 205-b). The UE 115-a may receive the control message 210-b from the TRP 205-a (e.g., depicted), the TRP 205-b, or both.

In some examples, the first threshold may be the same as the second threshold based on the TRP 205-a and the TRP 205-b being associated with the network entity 105 (e.g., a same thresholds is configured per cell group). Alternatively, the first threshold may be different than the second threshold based on the TRP 205-a being associated with the reference signal set 215-a and the TRP 205-b being associated with the reference signal set 215-b (e.g., the thresholds are configured per reference signal set 215). Additionally, or alternatively, the first relaxation factor may be the same as the second relaxation factor based on the TRP 205-a and the TRP 205-b being associated with the network entity 105 (e.g., a same relaxation factor is configured per cell group). Alternatively, the first relaxation factor may be different than the second relaxation factor based on the TRP 205-a being associated with the reference signal set 215-a and the TRP 205-b being associated with the reference signal set 215-b (e.g., the relaxation factors are configured per reference signal set 215).

The thresholds may be based on a channel quality metric associated with the reference signal sets 215. For example, the thresholds may be SINR thresholds such that a reference signal 220 of the reference signal set 215-a satisfies the first threshold based on a SINR of the reference signal 220 exceeding the first threshold. In other words, the TRP 205-a may satisfy (e.g., fulfill) good serving cell criterion based on one or more reference signals 220 of the reference signal set 215-a satisfying the first threshold. Conversely, the reference signal 220 of the reference signal set 215-a may fail to satisfy the first threshold based on the SINR of the reference signal 220 failing to exceed (e.g., or meeting) the first threshold. In other words, the TRP 205-a may fail to satisfy the good serving cell criterion based on the reference signals 220 (e.g., all reference signals 220) of the reference signal set 215-a failing to satisfy the first threshold.

As such, the UE 115-a may measure respective channel quality metrics (e.g., SINRs) for the multiple reference signals 220 of the reference signal sets 215 and compare the respective channel quality metrics to the respective thresholds. For example, as discussed previously, the UE 115-a may measure respective channel quality metrics of each reference signal 220 of the reference signal set 215-a and compare the channel quality metrics to the first threshold. Similarly, the UE 115-a may measure respective channel quality metrics of each reference signal 220 of the reference signal set 215-b and compare the channel quality metrics to the second threshold.

Additionally, the UE 115-a may measure a mobility metric associated with the network entity 105 (e.g., associated with the TRP 205-a and the TRP 205-b, per cell group). In some examples, the UE 115-a may satisfy low mobility criterion based on the mobility metric satisfying a mobility threshold. In other words, the UE 115-a may be in a low mobility scenario based on the mobility metric satisfying the threshold.

As such, the UE 115-a may perform BFD measurement relaxation per-TRP 205. That is, the UE 115-a may adjust a measurement periodicity of the reference signal set 215-a based on the UE 115-a being in a low mobility scenario (e.g., satisfying the low mobility criterion) and based on channel quality metrics associated with one or more reference signals 220 of the reference signal set 215-a satisfying the first threshold. In such cases, the UE 115-a may adjust the measurement periodicity of the reference signal set 215-a based on the first relaxation factor. In other words, the first relaxation factor (e.g., and the second relaxation factor) may indicate an adjustment to a time gap 230 between successive measurements of reference signals 220.

For example, (e.g., prior to BFD measurement relaxation of the reference signal set 215-a), the UE 115-a may measure reference signals 220 of the reference signal set 215-a according to a first measurement periodicity of the reference signal set 215-a associated with a time gap 230-a (e.g., the time gap 230-a may occur between each measurement of the reference signals 220 of the reference signal set 215-a). Further, the UE 115-a may adjust the measurement periodicity of the reference signal set 215-a from the first measurement periodicity of the reference signal set 215-a to a second measurement periodicity of the reference signal set 215-a. The second measurement periodicity of the reference signal set 215-a may be associated with a time gap 230-b (e.g., the time gap 230-*b* may occur between each measurement of the reference signals 220 of the reference signal set 215-*a*), where the time gap 230-*b* is longer in duration that the time gap 230-*a*. In some examples, the first relaxation factor may indicate the time gap 230-*b*. In some other examples, the first relaxation factor may indicate a scaling factor between the time gap 230-*a* and the time gap 230-*b*.

Additionally, the UE 115-*a* may adjust the measurement periodicity of the reference signal set 215-*a* from the second measurement periodicity of the reference signal set 215-*a* to the first measurement periodicity of the reference signal set 215-*a* based on the UE 115-*a* entering a high mobility scenario or based on the channel quality metrics associated with the reference signals 220 (e.g., all reference signals 220) of the reference signal set 215-*a* falling below the first threshold.

Conversely, the UE 115-*a* may maintain the measurement periodicity of the reference signal set 215-*a* based on the UE 115-*a* being in a high mobility scenario (e.g., not satisfying the low mobility criterion) or based on the channel quality metrics associated with the reference signals 220 (e.g., all reference signals 220) of the reference signal set 215-*a* failing to satisfy the first threshold.

Similarly, the UE 115-*a* may adjust a measurement periodicity of the reference signal set 215-*b* based on the UE 115-*a* being in a low mobility scenario (e.g., satisfying the low mobility criterion) and based on channel quality metrics associated with one or more reference signals 220 of the reference signal set 215-*b* satisfying the second threshold. In such cases, the UE 115-*a* may adjust the measurement periodicity of the reference signal set 215-*b* based on the second relaxation factor. Conversely, the UE 115-*a* may maintain the measurement periodicity of the reference signal set 215-*b* based on the UE 115-*a* being in a high mobility scenario (e.g., not satisfying the low mobility criterion) or based on the channel quality metrics associated with the reference signals 220 (e.g., all reference signals 220) of the reference signal set 215-*b* failing to satisfy the second threshold.

Additionally, the UE 115-*a* may transit a report 225 (e.g., relaxation status report 225) indicating the adjustment of the measurement periodicity for the reference signal set 215-*a*, the adjustment of the measurement periodicity for the reference signal set 215-*b*, or both. In other words, increasing (e.g., extending) the measurement periodicity (e.g., increasing a time gap 230) for a reference signal set 215 may be associated with the respective TRP 205 entering relaxation. Conversely, decreasing (e.g., reducing) the measurement periodicity (e.g., decreasing a time gap 230) for a reference signal set 215 may be associated with the respective TRP 205 exiting relaxation. As such, the UE 115-*a* may transmit the report 225 indicating a change in relaxation status of the TRP 205-*a*, the TRP 205-*b*, or both, based on adjusting the measurement periodicity for the reference signal set 215-*a*, adjusting the measurement periodicity for the reference signal set 215-*b*, or both. The report 225 may include an indication of the first CORESET associated with the TRP 205-*a*, the second CORESET associated with the TRP 205-*b*, or both, respectively (e.g., rather than an identifier associated with the network entity 105, a cell identifier). The UE 115-*a* may transmit the report 225 to the TRP 205-*a* (e.g., depicted), the TRP 205-*b*, or both.

Though described in the context of the TRP 205-*a* and the TRP 205-*b*, this is not to be regarded as a limitation of the present disclosure. In this regard, any quantity of TRPs 205 (e.g., any quantity of reference signal sets 215) may be considered with regards to the techniques described herein.

Figure 3:
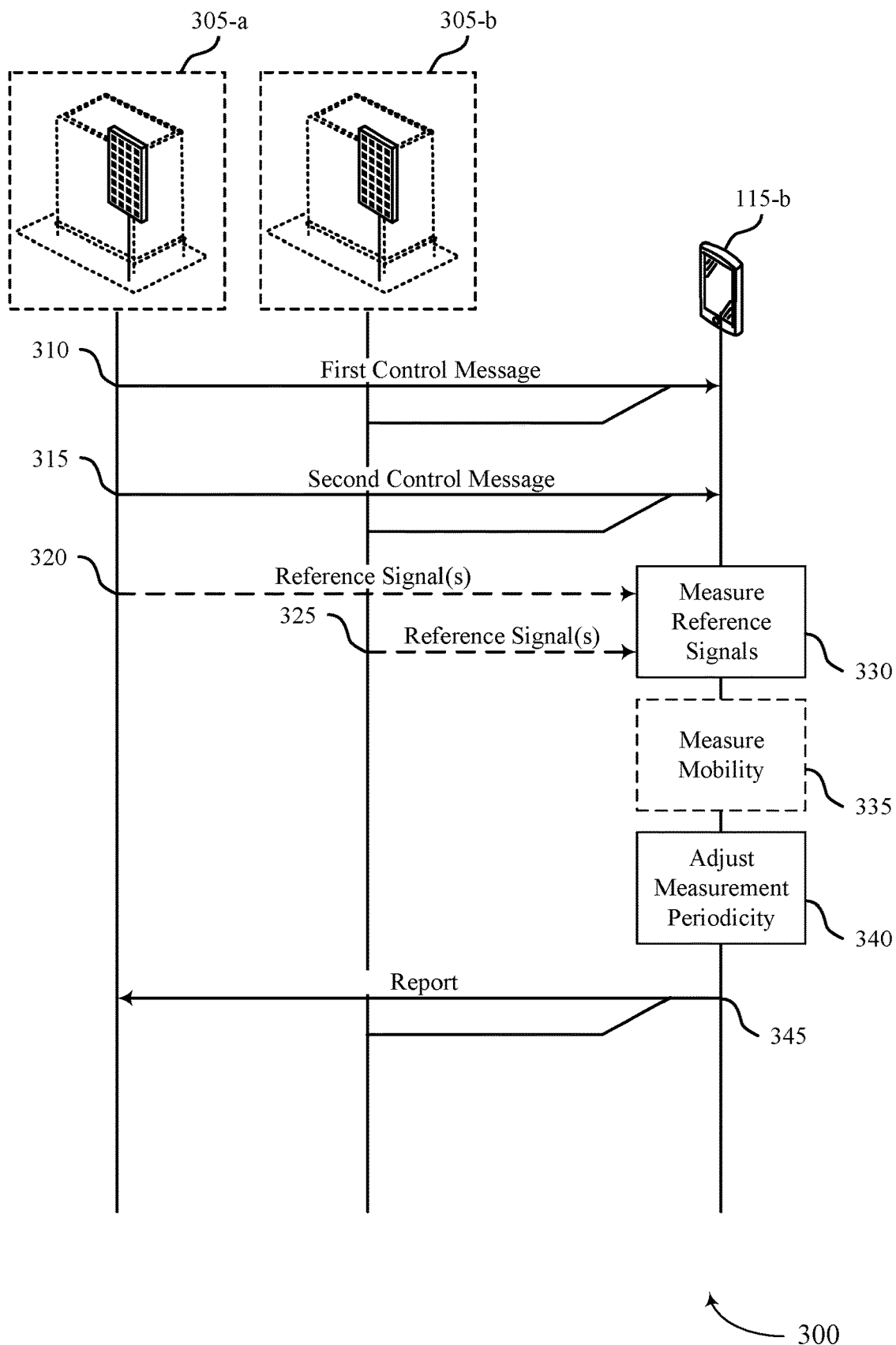
FIG. 3 illustrates an example of a process flow that supports BFD measurement relaxation for cells with multiple TRPs in accordance with one or more aspects of the present disclosure.

FIG. 3 illustrates an example of a process flow 300 that supports BFD measurement relaxation for cells with multiple TRPs in accordance with one or more aspects of the present disclosure. The process flow 300 may implement or be implemented by aspects of the wireless communication system 100 and the wireless communications system 200. For example, the process flow 300 may include one or more network entities 105 (e.g., a network entity 105 associated with a wireless device 305-*a* and a wireless device 305-*b*) and one or more UEs 115 (e.g., a UE 115-*b*), which may represent examples of corresponding devices as described with reference to FIG. 1. In some examples, the UE 115-*b* may adjust a measurement periodicity for a first set of reference signals associated with the wireless device 305-*a*, a second set of reference signals associated with the wireless device 305-*b*, or both.

At 310, the wireless device 305-*a* (e.g., TRP 305-*a*), the wireless device 305-*b* (e.g., TRP 305-*b*), or both, may transmit, to the UE 115-*b*, a first control message indicative of a plurality of CORESET identifiers, where each CORESET identifier is associated with a respective wireless device 305 (e.g., TRP) of a cell (e.g., network entity 105). In other words, the UE 115-*b* may be configured for multi-TRP communications. For example, a first CORESET identifier may be associated with the wireless device 305-*a* and a second CORESET identifier may be associated with the wireless device 305-*b*.

At 315, the wireless device 305-*a*, the wireless device 305-*b*, or both, may transmit, to the UE 115-*b*, one or more second control messages indicative of a set of (e.g., one or more) parameters associated with adjusting one or more measurement periodicities associated with measurements of multiple reference signals by the UE 115-*b*. The one or more parameters may be associated with adjusting measurement periodicities with the multiple reference signals. Additionally, the multiple reference signals may include a first set of reference signals associated with the wireless device 305-*a* and a second set of reference signals associated with the wireless device 305-*b*.

For example, the wireless device 305-*a* may transmit a second control message indicating a first subset of the set of parameters associated with adjusting a measurement periodicity of the first set of reference signals associated with the wireless device 305-*a*. Additionally, or alternatively, the wireless device 305-*b* may transit a second control message indicating a second subset of the set of parameters associated with adjusting a measurement periodicity of the second set of reference signals associated with the wireless device 305-*b*. In another example, the wireless device 305-*a*, the wireless device 305-*b*, or both, may transmit a second control message indicating the first subset of the set of parameters and the second subset of the set of parameters (e.g., indicating the set of parameters).

In some cases, the first subset of the set of parameters may include a first relaxation factor (e.g., a first parameter of the set of parameters), a first threshold (e.g., a second parameter of the set of parameters), or both, and the second subset of the set of parameters may include a second relaxation factor (e.g., a third parameter of the set of parameters), a second threshold (e.g., a fourth parameter of the set of parameters), or both.

In some examples, the first relaxation factor and the second relaxation factor may be the same based on the wireless device 305-*a* and the wireless device 305-*b* being associated with the network entity 105 (e.g., a same cell). Alternatively, the first relaxation factor and the second relaxation factor may be different based on the first wireless device 305-*a* being associated with the first set of reference signals and the second wireless device 305-*b* being associated with the second set of reference signals.

Similarly, the first threshold and the second threshold may be the same based on the first wireless device 305-*a* and the second wireless device 305-*b* being associated with the network entity 105. Alternatively, the first threshold and the second threshold may be different based on the first wireless device 305-*a* being associated with the first set of reference signals and the second wireless device 305-*b* being associated with the second set of reference signals In some cases, at 320, the wireless device 305-*a* may transmit the first set of reference signals. The first set of reference signals may include one or more first reference signals.

In some cases, at 325, the wireless device 305-*b* may transmit the second set of reference signals. The second set of reference signals may include one or more second reference signals.

At 330, the UE 115-*b* may measure respective channel quality metrics for the multiple reference signals. That is, the UE 115-*b* may measure each of the one or more first reference signals and each of the one or more second reference signals. The respective channel quality metrics may be SINRs.

In some cases, at 335, the UE 115-*b* may determine a mobility metric associated with the UE 115-*b*. The mobility metric may be associated with the wireless device 305-*a* and the wireless device 305-*b* based on the wireless device 305-*a* and the wireless device 305-*b* being associated with the network entity 105 (e.g., being part of a same cell group associated with the network entity 105).

At 340, the UE 115-*b* may adjust the measurement periodicity for the first set of reference signals according to the first parameter of the set of parameters based on a first channel quality metric (e.g., a first SINR) associated with the first set of reference signals (e.g., exceeding the first threshold). The measurement periodicity for the first set of reference signals may be separately adjustable relative to the measurement periodicity for the second set of reference signals.

As such, the UE 115-*b* may maintain the measurement periodicity for the second set of reference signals based on a second channel quality metric (e.g., a second SINR) associated with the second set of reference signals (e.g., meeting or failing to exceed the second threshold). Alternatively, the UE 115-*b* may adjust the measurement periodicity for the second set of reference signals according to the third parameter of the set of parameters based on the second channel quality metric associated with the second set of reference signals (e.g., exceeding the second threshold).

In some examples, adjusting the measurement periodicity of the first set of reference signals may include adjusting a time gap between successive measurement for the first set of reference signals based on the first SINR associated with the first set of reference signals (e.g., associated with at least one of the one or more first reference signals) exceeding the first threshold. Similarly, adjusting the measurement periodicity of the second set of reference signals may include adjusting a time gap between successive measurement for the second set of reference signals based on the second SINR associated with the second set of reference signals (e.g., associated with at least one of the one or more second reference signals) exceeding the second threshold. Additionally, the UE 115-*b* may adjust the measurement periodicity of the first set of reference signals, the measurement periodicity of the second set of reference signals, or both, based on the mobility metric associated with the UE 115-*b* being associated with a low mobility scenario (e.g., failing to exceed a mobility threshold).

Conversely, maintaining the measurement periodicity for the second set of reference signals may include maintaining the measurement periodicity for the second set of reference signals based on the second SINR associated with the second set of reference signals (e.g., associated with each of the one or more second reference signals) failing to exceed (e.g., or meeting) the second threshold.

At 345, the UE 115-*b* may transmit (e.g., to the wireless device 305-*a*, the wireless device 305-*b*, or both) a report indicating the adjustment of the measurement periodicity for the first set of reference signals. In such cases, the report may include an indication of the first CORESET identifier associated with the wireless device 305-*a*. In some examples, the report may further indicate the adjustment of the measurement periodicity for the second set of reference signals. In such cases, the report may include an indication of the second CORESET identifier associated with the wireless device 305-*b*. In some examples, the UE 115-*b* may transmit the report via UE assistance information.

Figure 4:
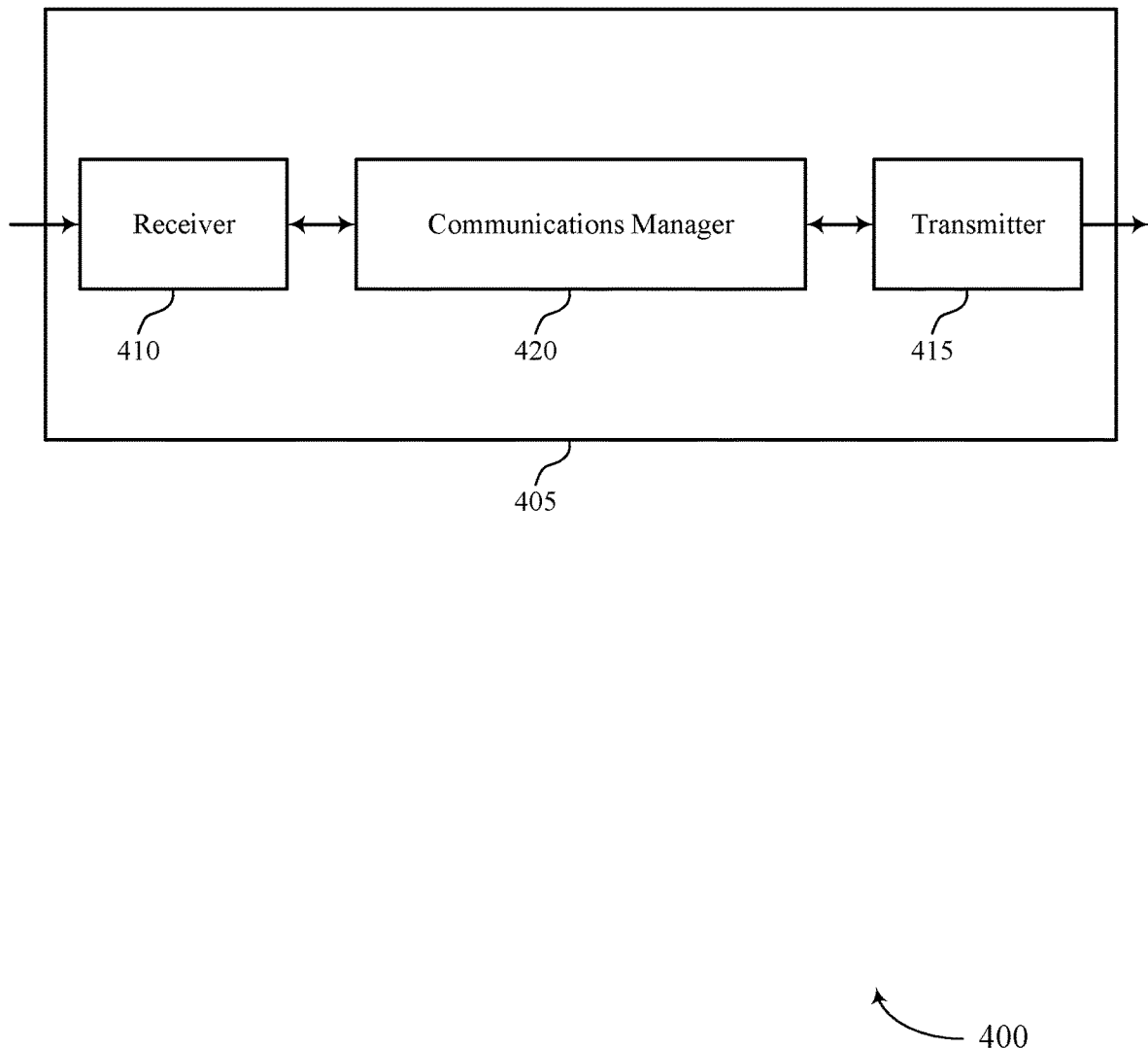
FIGS. 4 and 5 illustrate block diagrams of devices that support BFD measurement relaxation for cells with multiple TRPs in accordance with one or more aspects of the present disclosure.

FIG. 4 illustrates a block diagram 400 of a device 405 that supports BFD measurement relaxation for cells with multiple TRPs in accordance with one or more aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to BFD measurement relaxation for cells with multiple TRPs). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to BFD measurement relaxation for cells with multiple TRPs). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of BFD measurement relaxation for cells with multiple TRPs as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications at a UE in accordance with examples as disclosed herein. For example, the communications manager 420 may be configured as or otherwise support a means for receiving a control message indicative of one or more parameters associated with measuring a set of multiple reference signals, where the one or more parameters are associated with adjusting one or more measurement periodicities associated with the set of multiple reference signals. The communications manager 420 may be configured as or otherwise support a means for measuring respective channel quality metrics for the set of multiple reference signals, where the set of multiple reference signals includes a first set of reference signals associated with a first TRP of a cell and a second set of reference signals associated with a second TRP of the cell. The communications manager 420 may be configured as or otherwise support a means for adjusting a measurement periodicity for the first set of reference signals according to a first parameter of the one or more parameters based on a first channel quality metric associated with the first set of reference signals, where the measurement periodicity for the first set of reference signals is separately adjustable relative to a measurement periodicity for the second set of reference signals.

By including or configuring the communications manager 420 in accordance with examples as described herein, the device 405 (e.g., a processor controlling or otherwise coupled with the receiver 410, the transmitter 415, the communications manager 420, or a combination thereof) may support techniques for BFD measurement relaxation for multi-TRP scenarios which may result in reduced processing, reduced power consumption, and more efficient utilization of communication resources, among other advantages.

Figure 5:
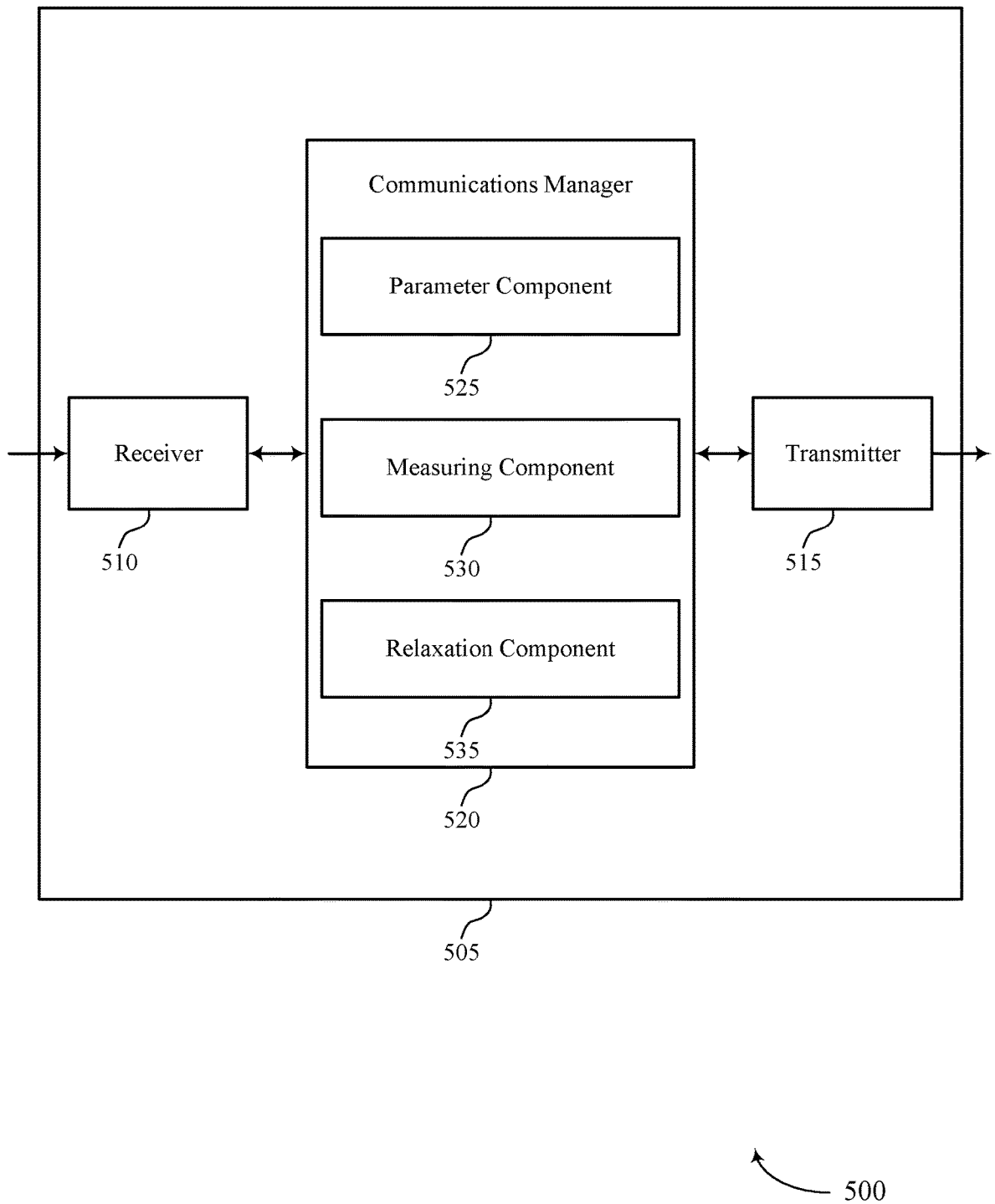

FIG. 5 illustrates a block diagram 500 of a device 505 that supports BFD measurement relaxation for cells with multiple TRPs in accordance with one or more aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to BFD measurement relaxation for cells with multiple TRPs). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to BFD measurement relaxation for cells with multiple TRPs). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of BFD measurement relaxation for cells with multiple TRPs as described herein. For example, the communications manager 520 may include a parameter component 525, a measuring component 530, a relaxation component 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a UE in accordance with examples as disclosed herein. The parameter component 525 may be configured as or otherwise support a means for receiving a control message indicative of one or more parameters associated with measuring a set of multiple reference signals, where the one or more parameters are associated with adjusting one or more measurement periodicities associated with the set of multiple reference signals. The measuring component 530 may be configured as or otherwise support a means for measuring respective channel quality metrics for the set of multiple reference signals, where the set of multiple reference signals includes a first set of reference signals associated with a first TRP of a cell and a second set of reference signals associated with a second TRP of the cell. The relaxation component 535 may be configured as or otherwise support a means for adjusting a measurement periodicity for the first set of reference signals according to a first parameter of the one or more parameters based on a first channel quality metric associated with the first set of reference signals, where the measurement periodicity for the first set of reference signals is separately adjustable relative to a measurement periodicity for the second set of reference signals.

Figure 6:
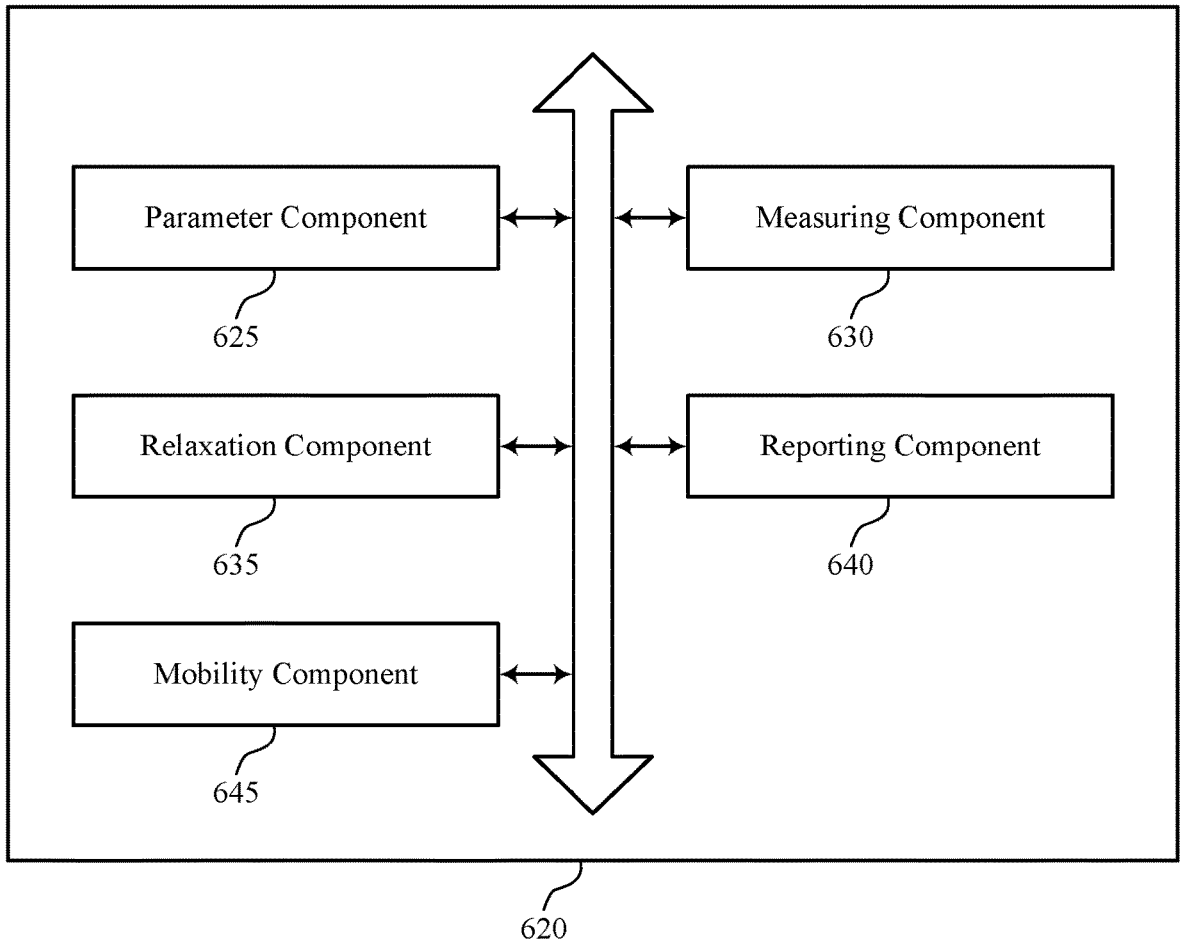
FIG. 6 illustrates a block diagram of a communications manager that supports BFD measurement relaxation for cells with multiple TRPs in accordance with one or more aspects of the present disclosure.

FIG. 6 illustrates a block diagram 600 of a communications manager 620 that supports BFD measurement relaxation for cells with multiple TRPs in accordance with one or more aspects of the present disclosure. The communications manager 620 may be an example of aspects of a communications manager 420, a communications manager 520, or both, as described herein. The communications manager 620, or various components thereof, may be an example of means for performing various aspects of BFD measurement relaxation for cells with multiple TRPs as described herein. For example, the communications manager 620 may include a parameter component 625, a measuring component 630, a relaxation component 635, a reporting component 640, a mobility component 645, or any combination thereof. Each of these components may communicate, directly or indirectly, with one another (e.g., via one or more buses).

The communications manager 620 may support wireless communications at a UE in accordance with examples as disclosed herein. The parameter component 625 may be configured as or otherwise support a means for receiving a control message indicative of one or more parameters associated with measuring a set of multiple reference signals, where the one or more parameters are associated with adjusting one or more measurement periodicities associated with the set of multiple reference signals. The measuring component 630 may be configured as or otherwise support a means for measuring respective channel quality metrics for the set of multiple reference signals, where the set of multiple reference signals includes a first set of reference signals associated with a first TRP of a cell and a second set of reference signals associated with a second TRP of the cell. The relaxation component 635 may be configured as or otherwise support a means for adjusting a measurement periodicity for the first set of reference signals according to a first parameter of the one or more parameters based on a first channel quality metric associated with the first set of reference signals, where the measurement periodicity for the first set of reference signals is separately adjustable relative to a measurement periodicity for the second set of reference signals.

In some examples, to support adjusting the measurement periodicity for the first set of reference signals, the relaxation component 635 may be configured as or otherwise support a means for adjusting a time gap between successive measurements for the first set of reference signals based on a first SINR associated with the first set of reference signals exceeding a first threshold.

In some examples, the control message indicates the first threshold associated with the first set of reference signals and a second threshold associated with the second set of reference signals.

In some examples, the first threshold and the second threshold are the same based on the first TRP and the second TRP being associated with the cell.

In some examples, the first threshold and the second threshold are different based on the first TRP being associated with the first set of reference signals and the second TRP being associated with the second set of reference signals.

In some examples, the relaxation component 635 may be configured as or otherwise support a means for maintaining the measurement periodicity for the second set of reference signals based on a second channel quality metric associated with the second set of reference signals failing to exceed a threshold.

In some examples, maintaining the measurement periodicity for the second set of reference signals is based on an SINR associated with the second set of reference signals failing to exceed a threshold. In some examples, the second channel quality metric is the SINR.

In some examples, the relaxation component 635 may be configured as or otherwise support a means for adjusting the measurement periodicity for the second set of reference signals according to a second parameter of the one or more parameters based on a second channel quality metric associated with the second set of reference signals.

In some examples, the first parameter and the second parameter are the same based on the first TRP and the second TRP being associated with the cell.

In some examples, the first parameter and the second parameter are different based on the first TRP being associated with the first set of reference signals and the second TRP being associated with the second set of reference signals.

In some examples, adjusting the measurement periodicity for the second set of reference signals is based on an SINR associated with the second set of reference signals exceeding a threshold. In some examples, the second channel quality metric is the SINR.

In some examples, the reporting component 640 may be configured as or otherwise support a means for transmitting a report indicating the adjustment of the measurement periodicity for the first set of reference signals, where the report includes an indication of a first CORESET identifier associated with the first TRP of the cell.

In some examples, the report further indicates an adjustment of the measurement periodicity for the second set of reference signals. In some examples, the report includes an indication of a second CORESET identifier associated with the second TRP of the cell.

In some examples, the report is transmitted via UE assistance information.

In some examples, the mobility component 645 may be configured as or otherwise support a means for determining a mobility metric associated with the UE, where adjusting the measurement periodicity for the first set of reference signals is based on the mobility metric associated with the UE being associated with a low mobility scenario.

In some examples, the mobility metric is associated with the first TRP and the second TRP based on the first TRP and the second TRP being associated with the cell.

In some examples, the parameter component 625 may be configured as or otherwise support a means for receiving a second control message indicative of a set of multiple CORESET identifiers, where each CORESET identifier is associated with a respective TRP of the cell.

In some examples, adjusting the measurement periodicity for the first set of reference signals includes increasing a time gap between successive measurements of the first set of reference signals based on the first parameter.

Figure 7:
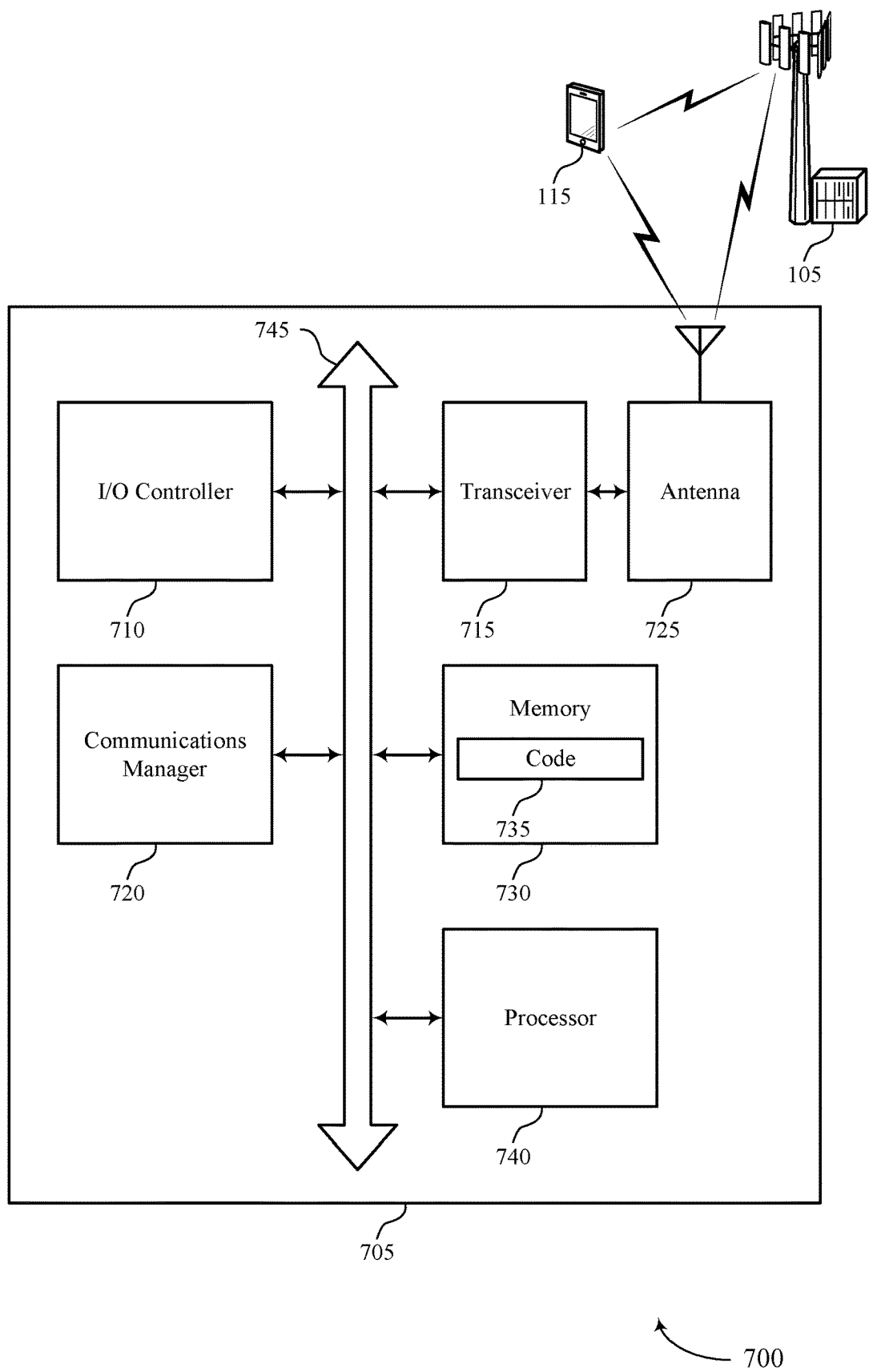
FIG. 7 illustrates a diagram of a system including a device that supports BFD measurement relaxation for cells with multiple TRPs in accordance with one or more aspects of the present disclosure.

FIG. 7 illustrates a diagram of a system 700 including a device 705 that supports BFD measurement relaxation for cells with multiple TRPs in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting BFD measurement relaxation for cells with multiple TRPs). For example, the device 705 or a component of the device 705 may include a processor 740 and memory 730 coupled with or to the processor 740, the processor 740 and memory 730 configured to perform various functions described herein.

The communications manager 720 may support wireless communications at a UE in accordance with examples as disclosed herein. For example, the communications manager 720 may be configured as or otherwise support a means for receiving a control message indicative of one or more parameters associated with measuring a set of multiple reference signals, where the one or more parameters are associated with adjusting one or more measurement periodicities associated with the set of multiple reference signals. The communications manager 720 may be configured as or otherwise support a means for measuring respective channel quality metrics for the set of multiple reference signals, where the set of multiple reference signals includes a first set of reference signals associated with a first TRP of a cell and a second set of reference signals associated with a second TRP of the cell. The communications manager 720 may be configured as or otherwise support a means for adjusting a measurement periodicity for the first set of reference signals according to a first parameter of the one or more parameters based on a first channel quality metric associated with the first set of reference signals, where the measurement periodicity for the first set of reference signals is separately adjustable relative to a measurement periodicity for the second set of reference signals.

By including or configuring the communications manager 720 in accordance with examples as described herein, the device 705 may support techniques for BFD measurement relaxation for multi-TRP scenarios which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of BFD measurement relaxation for cells with multiple TRPs as described herein, or the processor 740 and the memory 730 may be otherwise configured to perform or support such operations.

Figure 8:
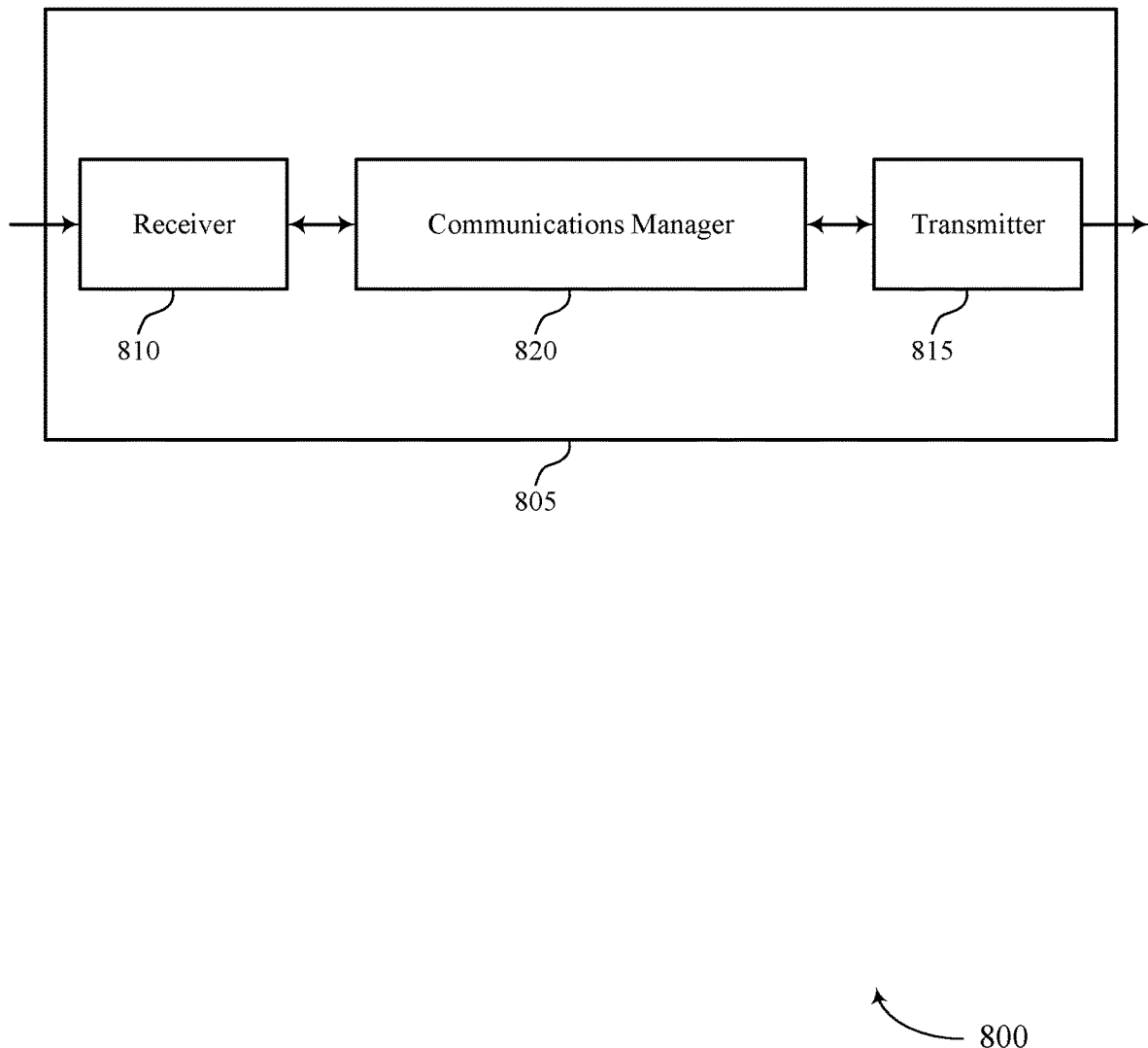
FIGS. 8 and 9 illustrate block diagrams of devices that support BFD measurement relaxation for cells with multiple TRPs in accordance with one or more aspects of the present disclosure.

FIG. 8 illustrates a block diagram 800 of a device 805 that supports BFD measurement relaxation for cells with multiple TRPs in accordance with one or more aspects of the present disclosure. The device 805 may be an example of aspects of a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of BFD measurement relaxation for cells with multiple TRPs as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a network entity in accordance with examples as disclosed herein. For example, the communications manager 820 may be configured as or otherwise support a means for transmitting a first control message indicative of a set of multiple CORESET identifiers, where each CORESET identifier is associated with a respective TRP of a cell. The communications manager 820 may be configured as or otherwise support a means for transmitting a second control message indicative of one or more parameters associated with adjusting one or more measurement periodicities associated with measurements of a set of multiple reference signals by a UE, where the set of multiple reference signals includes a first set of reference signals associated with a first TRP of the cell and a second set of reference signals associated with a second TRP of the cell. The communications manager 820 may be configured as or otherwise support a means for receiving a report indicative of an adjustment, by the UE, of a measurement periodicity for the first set of reference signals according to a first parameter of the one or more parameters, where the measurement periodicity for the first set of reference signals is separately adjustable relative to a measurement periodicity for the second set of reference signals.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for BFD measurement relaxation for multi-TRP scenarios which may result in reduced processing, reduced power consumption, and more efficient utilization of communication resources, among other advantages.

Figure 9:
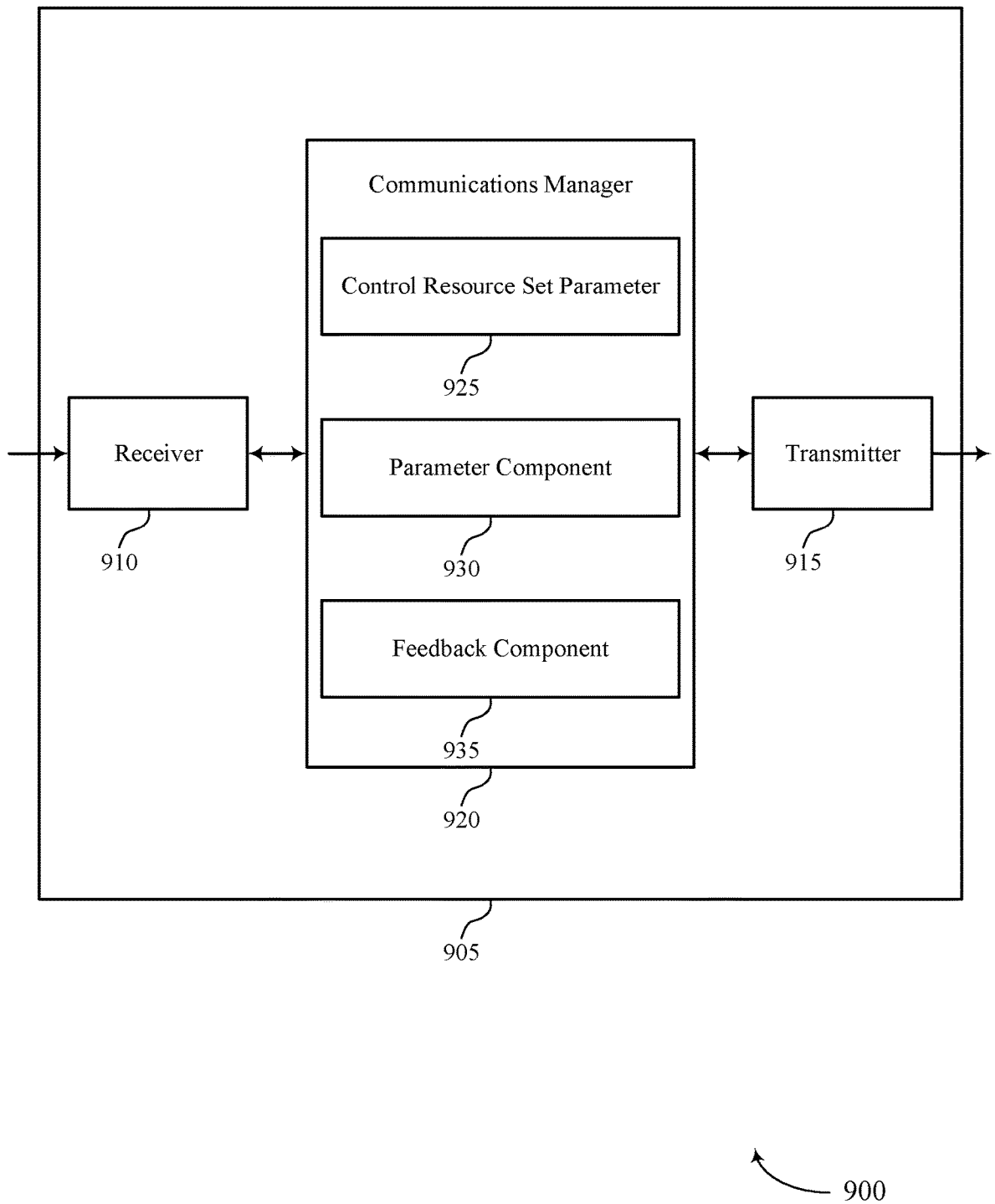

FIG. 9 illustrates a block diagram 900 of a device 905 that supports BFD measurement relaxation for cells with multiple TRPs in accordance with one or more aspects of the present disclosure. The device 905 may be an example of aspects of a device 805 or a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of BFD measurement relaxation for cells with multiple TRPs as described herein. For example, the communications manager 920 may include a CORESET parameter 925, a parameter component 930, a feedback component 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network entity in accordance with examples as disclosed herein. The CORESET parameter 925 may be configured as or otherwise support a means for transmitting a first control message indicative of a set of multiple CORESET identifiers, where each CORESET identifier is associated with a respective TRP of a cell. The parameter component 930 may be configured as or otherwise support a means for transmitting a second control message indicative of one or more parameters associated with adjusting one or more measurement periodicities associated with measurements of a set of multiple reference signals by a UE, where the set of multiple reference signals includes a first set of reference signals associated with a first TRP of the cell and a second set of reference signals associated with a second TRP of the cell. The feedback component 935 may be configured as or otherwise support a means for receiving a report indicative of an adjustment, by the UE, of a measurement periodicity for the first set of reference signals according to a first parameter of the one or more parameters, where the measurement periodicity for the first set of reference signals is separately adjustable relative to a measurement periodicity for the second set of reference signals.

Figure 10:
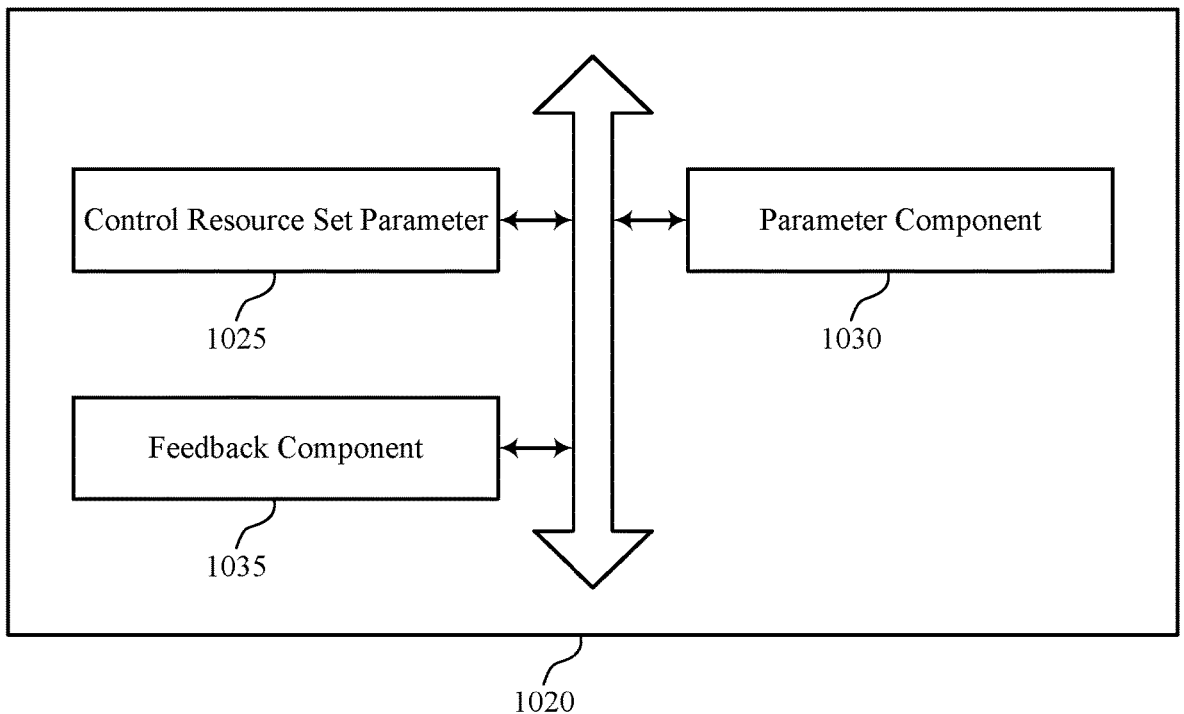
FIG. 10 illustrates a block diagram of a communications manager that supports BFD measurement relaxation for cells with multiple TRPs in accordance with one or more aspects of the present disclosure.

FIG. 10 illustrates a block diagram 1000 of a communications manager 1020 that supports BFD measurement relaxation for cells with multiple TRPs in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of BFD measurement relaxation for cells with multiple TRPs as described herein. For example, the communications manager 1020 may include a CORESET parameter 1025, a parameter component 1030, a feedback component 1035, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communications at a network entity in accordance with examples as disclosed herein. The CORESET parameter 1025 may be configured as or otherwise support a means for transmitting a first control message indicative of a set of multiple CORESET identifiers, where each CORESET identifier is associated with a respective TRP of a cell. The parameter component 1030 may be configured as or otherwise support a means for transmitting a second control message indicative of one or more parameters associated with adjusting one or more measurement periodicities associated with measurements of a set of multiple reference signals by a UE, where the set of multiple reference signals includes a first set of reference signals associated with a first TRP of the cell and a second set of reference signals associated with a second TRP of the cell. The feedback component 1035 may be configured as or otherwise support a means for receiving a report indicative of an adjustment, by the UE, of a measurement periodicity for the first set of reference signals according to a first parameter of the one or more parameters, where the measurement periodicity for the first set of reference signals is separately adjustable relative to a measurement periodicity for the second set of reference signals.

In some examples, first control message indicates one or more thresholds associated with channel quality metrics for the set of multiple reference signals, including a first threshold associated with the first set of reference signals and a second threshold associated with the second set of reference signals.

In some examples, the first threshold and the second threshold are the same based on the first TRP and the second TRP being associated with the cell.

In some examples, the first threshold and the second threshold are different based on the first TRP being associated with the first set of reference signals and the second TRP being associated with the second set of reference signals.

In some examples, the report includes an indication of a first CORESET identifier of the set of multiple CORESET identifiers. In some examples, the first CORESET identifier is associated with the first TRP of the cell.

In some examples, the report further indicates an adjustment, by the UE, of the measurement periodicity for the second set of reference signals according to a second parameter of the one or more parameters. In some examples, the report includes an indication of a second CORESET identifier associated with the second TRP of the cell.

In some examples, the first parameter and the second parameter are the same based on the first TRP and the second TRP being associated with the cell.

In some examples, the first parameter and the second parameter are different based on the first TRP being associated with the first set of reference signals and the second TRP being associated with the second set of reference signals.

In some examples, the report is received via UE assistance information.

Figure 11:
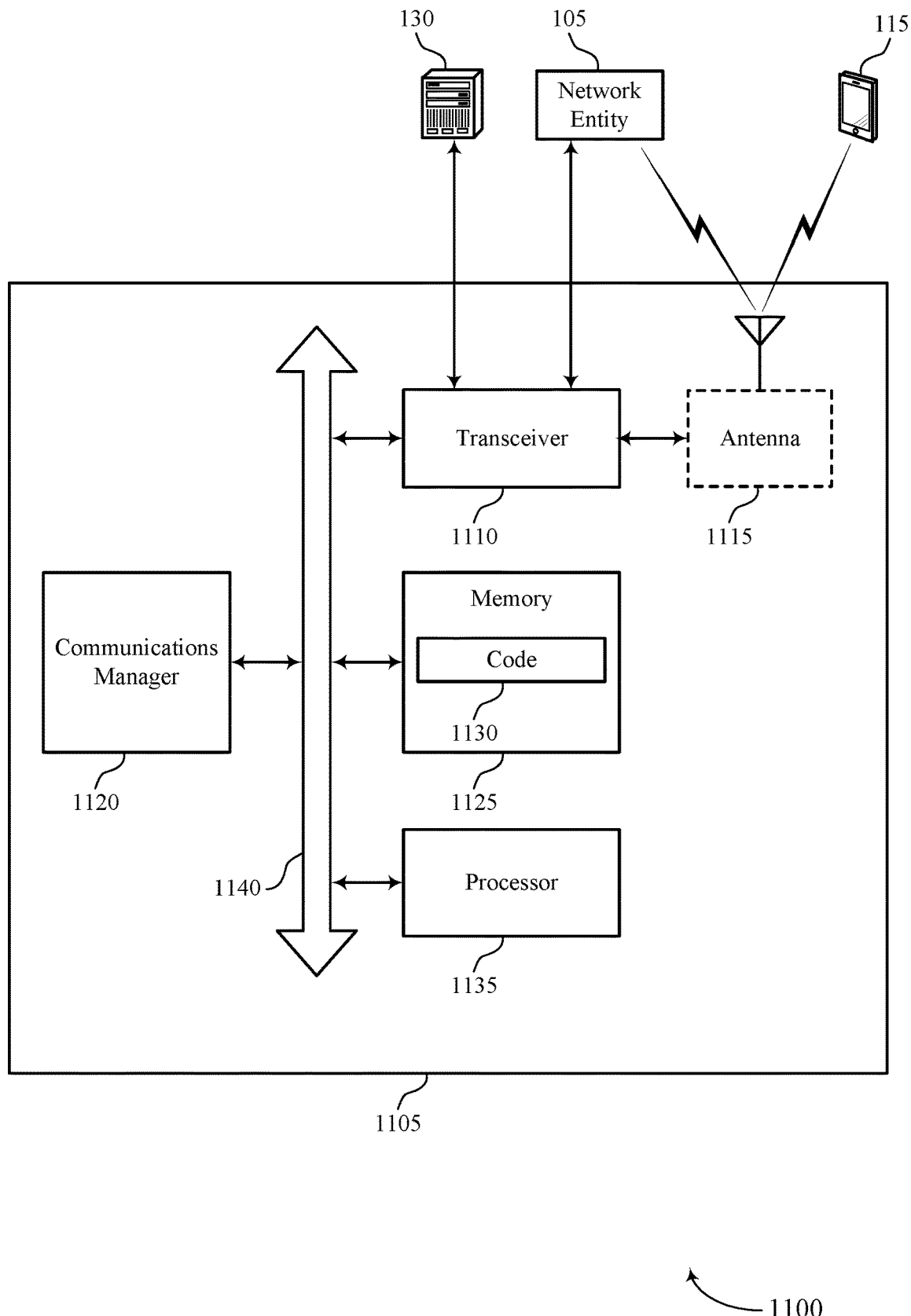
FIG. 11 illustrates a diagram of a system including a device that supports BFD measurement relaxation for cells with multiple TRPs in accordance with one or more aspects of the present disclosure.

FIG. 11 illustrates a diagram of a system 1100 including a device 1105 that supports BFD measurement relaxation for cells with multiple TRPs in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, a memory 1125, code 1130, and a processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. In some implementations, the transceiver 1110 may include one or more interfaces, such as one or more interfaces coupled with the one or more antennas 1115 that are configured to support various receiving or obtaining operations, or one or more interfaces coupled with the one or more antennas 1115 that are configured to support various transmitting or outputting operations, or a combination thereof. In some implementations, the transceiver 1110 may include or be configured for coupling with one or more processors or memory components that are operable to perform or support operations based on received or obtained information or signals, or to generate information or other signals for transmission or other outputting, or any combination thereof. In some implementations, the transceiver 1110, or the transceiver 1110 and the one or more antennas 1115, or the transceiver 1110 and the one or more antennas 1115 and one or more processors or memory components (for example, the processor 1135, or the memory 1125, or both), may be included in a chip or chip assembly that is installed in the device 1105. In some examples, the transceiver may be operable to support communications via one or more communications links (e.g., a communication link 125, a backhaul communication link 120, a midhaul communication link 162, a fronthaul communication link 168).

The memory 1125 may include RAM and ROM. The memory 1125 may store computer-readable, computer-executable code 1130 including instructions that, when executed by the processor 1135, cause the device 1105 to perform various functions described herein. The code 1130 may be stored in a non-transitory computer-readable medium such as system memory or another type of memory. In some cases, the code 1130 may not be directly executable by the processor 1135 but may cause a computer (e.g., when compiled and executed) to perform functions described herein. In some cases, the memory 1125 may contain, among other things, a BIOS which may control basic hardware or software operation such as the interaction with peripheral components or devices.

The processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1135 may be configured to operate a memory array using a memory controller. In some other cases, a memory controller may be integrated into the processor 1135. The processor 1135 may be configured to execute computer-readable instructions stored in a memory (e.g., the memory 1125) to cause the device 1105 to perform various functions (e.g., functions or tasks supporting BFD measurement relaxation for cells with multiple TRPs). For example, the device 1105 or a component of the device 1105 may include a processor 1135 and memory 1125 coupled with the processor 1135, the processor 1135 and memory 1125 configured to perform various functions described herein. The processor 1135 may be an example of a cloud-computing platform (e.g., one or more physical nodes and supporting software such as operating systems, virtual machines, or container instances) that may host the functions (e.g., by executing code 1130) to perform the functions of the device 1105. The processor 1135 may be any one or more suitable processors capable of executing scripts or instructions of one or more software programs stored in the device 1105 (such as within the memory 1125). In some implementations, the processor 1135 may be a component of a processing system. A processing system may generally refer to a system or series of machines or components that receives inputs and processes the inputs to produce a set of outputs (which may be passed to other systems or components of, for example, the device 1105). For example, a processing system of the device 1105 may refer to a system including the various other components or subcomponents of the device 1105, such as the processor 1135, or the transceiver 1110, or the communications manager 1120, or other components or combinations of components of the device 1105. The processing system of the device 1105 may interface with other components of the device 1105, and may process information received from other components (such as inputs or signals) or output information to other components. For example, a chip or modem of the device 1105 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1105 may transmit information output from the chip or modem. Additionally, or alternatively, in some implementations, the one or more interfaces may refer to an interface between the processing system of the chip or modem and a receiver, such that the device 1105 may obtain information or signal inputs, and the information may be passed to the processing system. A person having ordinary skill in the art will readily recognize that a first interface also may obtain information or signal inputs, and a second interface also may output information or signal outputs.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the memory 1125, the code 1130, and the processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communications at a network entity in accordance with examples as disclosed herein. For example, the communications manager 1120 may be configured as or otherwise support a means for transmitting a first control message indicative of a set of multiple CORESET identifiers, where each CORESET identifier is associated with a respective TRP of a cell. The communications manager 1120 may be configured as or otherwise support a means for transmitting a second control message indicative of one or more parameters associated with adjusting one or more measurement periodicities associated with measurements of a set of multiple reference signals by a UE, where the set of multiple reference signals includes a first set of reference signals associated with a first TRP of the cell and a second set of reference signals associated with a second TRP of the cell. The communications manager 1120 may be configured as or otherwise support a means for receiving a report indicative of an adjustment, by the UE, of a measurement periodicity for the first set of reference signals according to a first parameter of the one or more parameters, where the measurement periodicity for the first set of reference signals is separately adjustable relative to a measurement periodicity for the second set of reference signals.

By including or configuring the communications manager 1120 in accordance with examples as described herein, the device 1105 may support techniques for BFD measurement relaxation for multi-TRP scenarios which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the transceiver 1110, the processor 1135, the memory 1125, the code 1130, or any combination thereof. For example, the code 1130 may include instructions executable by the processor 1135 to cause the device 1105 to perform various aspects of BFD measurement relaxation for cells with multiple TRPs as described herein, or the processor 1135 and the memory 1125 may be otherwise configured to perform or support such operations.

Figure 12:
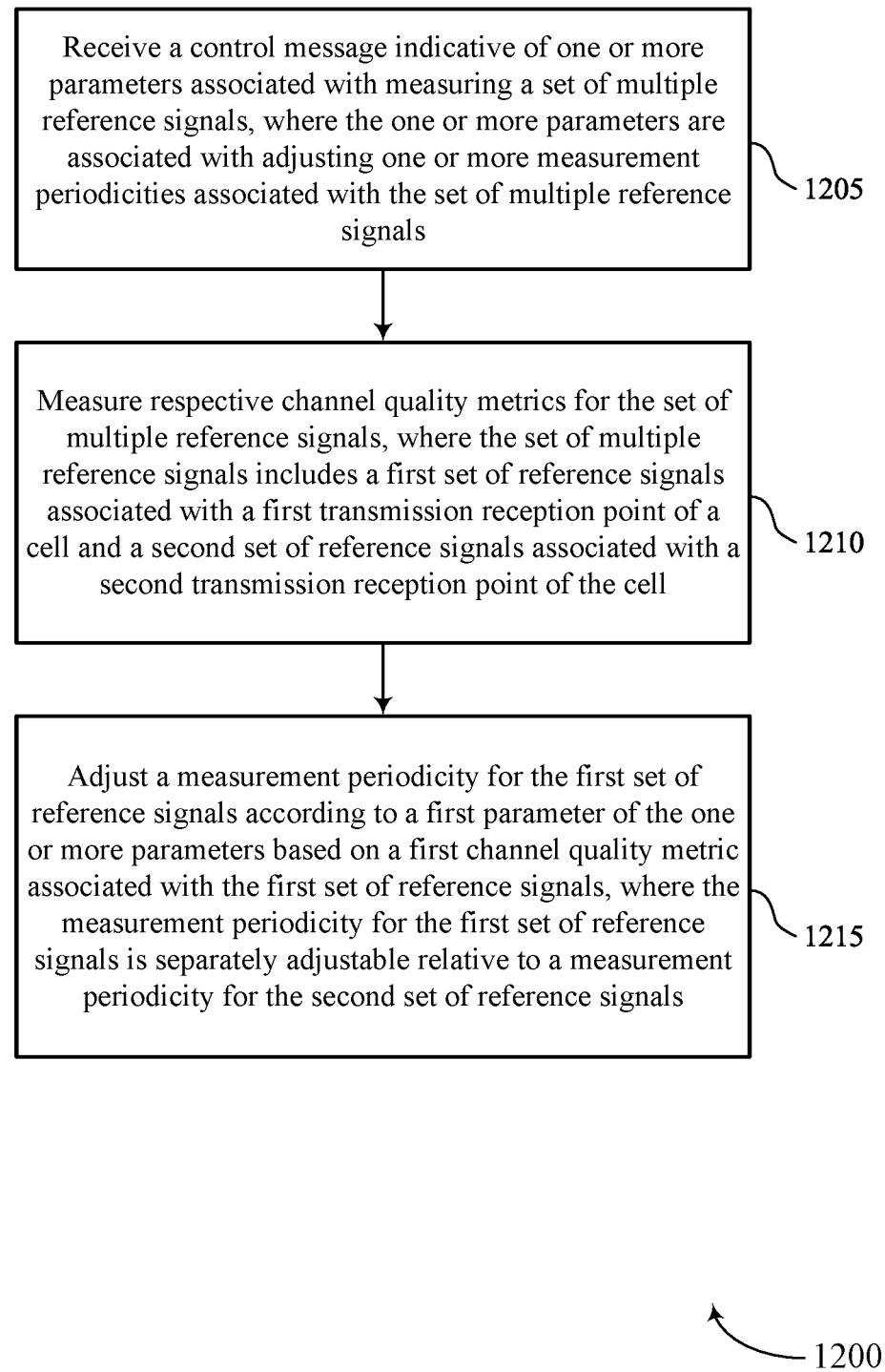
FIGS. 12 through 14 illustrate flowcharts showing methods that support BFD measurement relaxation for cells with multiple TRPs in accordance with one or more aspects of the present disclosure.

FIG. 12 illustrates a flowchart showing a method 1200 that supports BFD measurement relaxation for cells with multiple TRPs in accordance with one or more aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include receiving a control message indicative of one or more parameters associated with measuring a set of multiple reference signals, where the one or more parameters are associated with adjusting one or more measurement periodicities associated with the set of multiple reference signals. The operations of 1205 may be performed in accordance with examples as disclosed herein. In some examples, aspects of the operations of 1205 may be performed by a parameter component 625 as described with reference to FIG. 6. Additionally, or alternatively, means for performing 1205 may, but not necessarily, include, for example, antenna 725, transceiver 715, communications manager 720, memory 730 (including code 735), processor 740 and/or bus 745.

At 1210, the method may include measuring respective channel quality metrics for the set of multiple reference signals, where the set of multiple reference signals includes a first set of reference signals associated with a first TRP of a cell and a second set of reference signals associated with a second TRP of the cell. The operations of 1210 may be performed in accordance with examples as disclosed herein. In some examples, aspects of the operations of 1210 may be performed by a measuring component 630 as described with reference to FIG. 6. Additionally, or alternatively, means for performing 1210 may, but not necessarily, include, for example, antenna 725, transceiver 715, communications manager 720, memory 730 (including code 735), processor 740 and/or bus 745.

At 1215, the method may include adjusting a measurement periodicity for the first set of reference signals according to a first parameter of the one or more parameters based on a first channel quality metric associated with the first set of reference signals, where the measurement periodicity for the first set of reference signals is separately adjustable relative to a measurement periodicity for the second set of reference signals. The operations of 1215 may be performed in accordance with examples as disclosed herein. In some examples, aspects of the operations of 1215 may be performed by a relaxation component 635 as described with reference to FIG. 6. Additionally, or alternatively, means for performing 1215 may, but not necessarily, include, for example, antenna 725, transceiver 715, communications manager 720, memory 730 (including code 735), processor 740 and/or bus 745.

Figure 13:
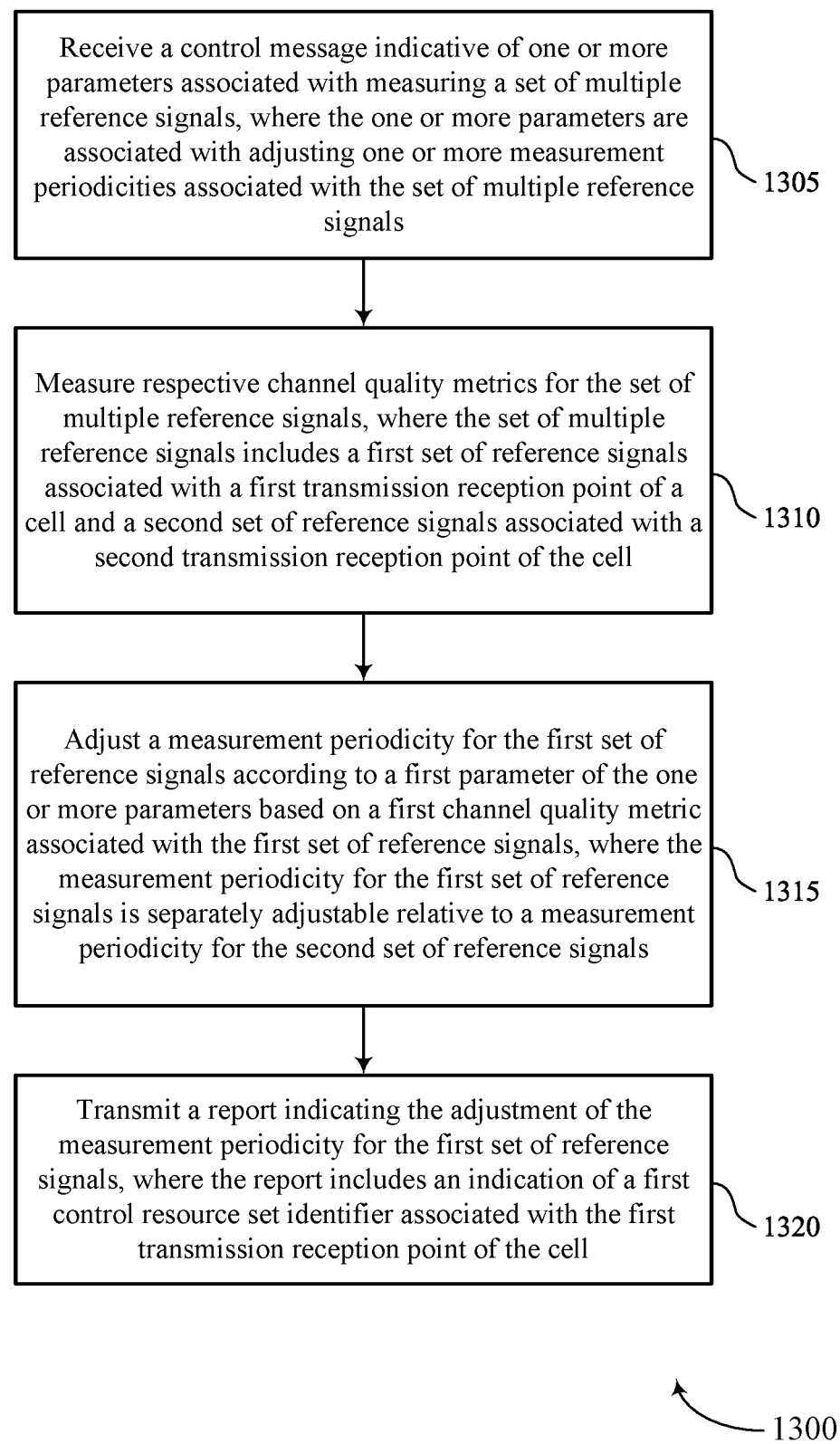

FIG. 13 illustrates a flowchart showing a method 1300 that supports BFD measurement relaxation for cells with multiple TRPs in accordance with one or more aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1305, the method may include receiving a control message indicative of one or more parameters associated with measuring a set of multiple reference signals, where the one or more parameters are associated with adjusting one or more measurement periodicities associated with the set of multiple reference signals. The operations of 1305 may be performed in accordance with examples as disclosed herein. In some examples, aspects of the operations of 1305 may be performed by a parameter component 625 as described with reference to FIG. 6. Additionally, or alternatively, means for performing 1305 may, but not necessarily, include, for example, antenna 725, transceiver 715, communications manager 720, memory 730 (including code 735), processor 740 and/or bus 745.

At 1310, the method may include measuring respective channel quality metrics for the set of multiple reference signals, where the set of multiple reference signals includes a first set of reference signals associated with a first TRP of a cell and a second set of reference signals associated with a second TRP of the cell. The operations of 1310 may be performed in accordance with examples as disclosed herein. In some examples, aspects of the operations of 1310 may be performed by a measuring component 630 as described with reference to FIG. 6. Additionally, or alternatively, means for performing 1310 may, but not necessarily, include, for example, antenna 725, transceiver 715, communications manager 720, memory 730 (including code 735), processor 740 and/or bus 745.

At 1315, the method may include adjusting a measurement periodicity for the first set of reference signals according to a first parameter of the one or more parameters based on a first channel quality metric associated with the first set of reference signals, where the measurement periodicity for the first set of reference signals is separately adjustable relative to a measurement periodicity for the second set of reference signals. The operations of 1315 may be performed in accordance with examples as disclosed herein. In some examples, aspects of the operations of 1315 may be performed by a relaxation component 635 as described with reference to FIG. 6. Additionally, or alternatively, means for performing 1315 may, but not necessarily, include, for example, antenna 725, transceiver 715, communications manager 720, memory 730 (including code 735), processor 740 and/or bus 745.

At 1320, the method may include transmitting a report indicating the adjustment of the measurement periodicity for the first set of reference signals, where the report includes an indication of a first CORESET identifier associated with the first TRP of the cell. The operations of 1320 may be performed in accordance with examples as disclosed herein. In some examples, aspects of the operations of 1320 may be performed by a reporting component 640 as described with reference to FIG. 6. Additionally, or alternatively, means for performing 1320 may, but not necessarily, include, for example, antenna 725, transceiver 715, communications manager 720, memory 730 (including code 735), processor 740 and/or bus 745.

Figure 14:
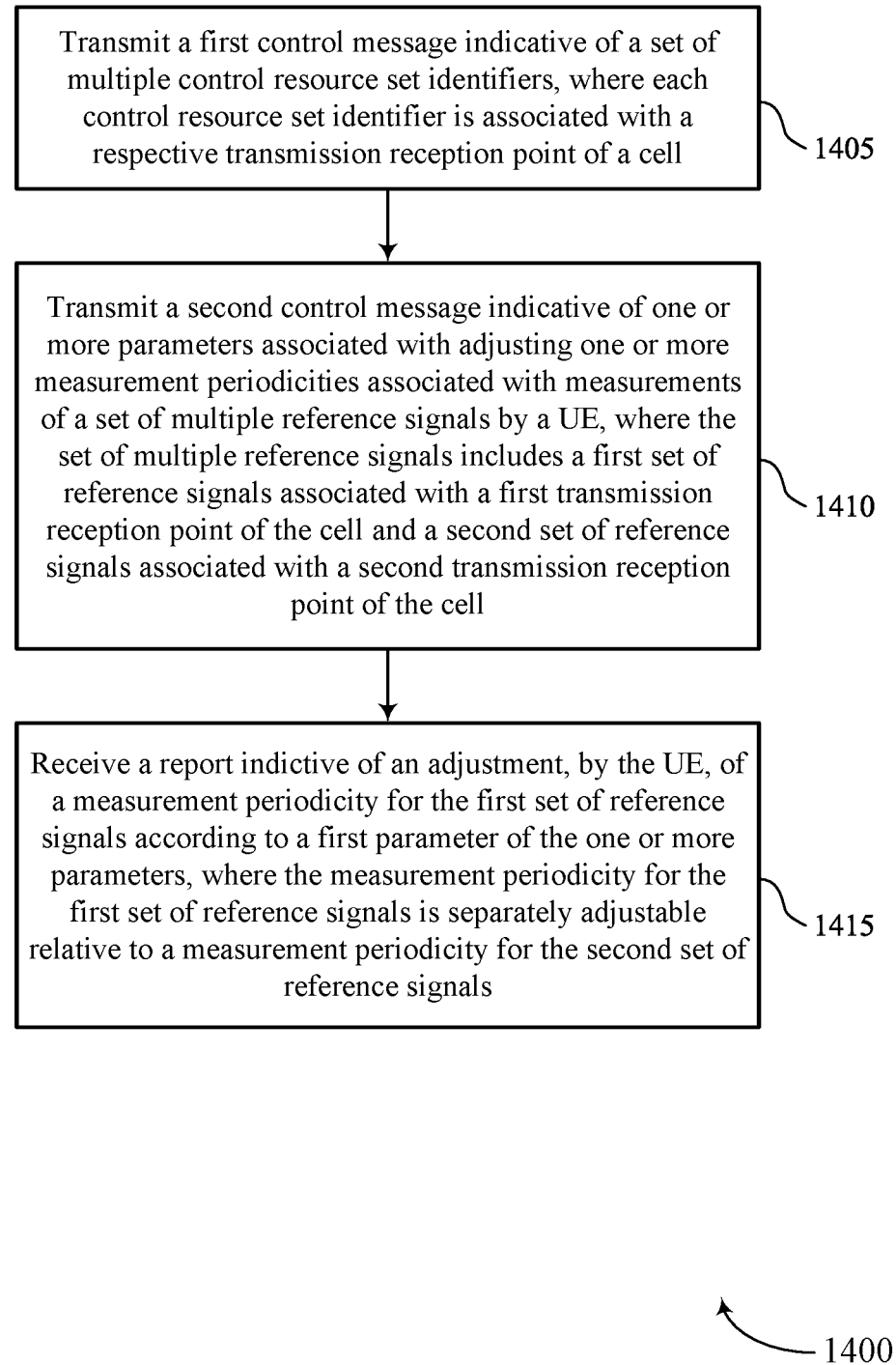

FIG. 14 illustrates a flowchart showing a method 1400 that supports BFD measurement relaxation for cells with multiple TRPs in accordance with one or more aspects of the present disclosure. The operations of the method 1400 may be implemented by a network entity or its components as described herein. For example, the operations of the method 1400 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1405, the method may include transmitting a first control message indicative of a set of multiple CORESET identifiers, where each CORESET identifier is associated with a respective TRP of a cell. The operations of 1405 may be performed in accordance with examples as disclosed herein. In some examples, aspects of the operations of 1405 may be performed by a CORESET parameter 1025 as described with reference to FIG. 10. Additionally, or alternatively, means for performing 1405 may, but not necessarily, include, for example, antenna 1115, transceiver 1110, communications manager 1120, memory 1125 (including code 1130), processor 1135 and/or bus 1140.

At 1410, the method may include transmitting a second control message indicative of one or more parameters associated with adjusting one or more measurement periodicities associated with measurements of a set of multiple reference signals by a UE, where the set of multiple reference signals includes a first set of reference signals associated with a first TRP of the cell and a second set of reference signals associated with a second TRP of the cell. The operations of 1410 may be performed in accordance with examples as disclosed herein. In some examples, aspects of the operations of 1410 may be performed by a parameter component 1030 as described with reference to FIG. 10. Additionally, or alternatively, means for performing 1410 may, but not necessarily, include, for example, antenna 1115, transceiver 1110, communications manager 1120, memory 1125 (including code 1130), processor 1135 and/or bus 1140.

At 1415, the method may include receiving a report indicative of an adjustment, by the UE, of a measurement periodicity for the first set of reference signals according to a first parameter of the one or more parameters, where the measurement periodicity for the first set of reference signals is separately adjustable relative to a measurement periodicity for the second set of reference signals. The operations of 1415 may be performed in accordance with examples as disclosed herein. In some examples, aspects of the operations of 1415 may be performed by a feedback component 1035 as described with reference to FIG. 10. Additionally, or alternatively, means for performing 1415 may, but not necessarily, include, for example, antenna 1115, transceiver 1110, communications manager 1120, memory 1125 (including code 1130), processor 1135 and/or bus 1140.

The following provides an overview of aspects of the present disclosure:

Aspect 1: A method for wireless communications at a UE, comprising: receiving a control message indicative of one or more parameters associated with measuring a plurality of reference signals, wherein the one or more parameters are associated with adjusting one or more measurement periodicities associated with the plurality of reference signals; measuring respective channel quality metrics for the plurality of reference signals, wherein the plurality of reference signals comprises a first set of reference signals associated with a first TRP of a cell and a second set of reference signals associated with a second TRP of the cell; and adjusting a measurement periodicity for the first set of reference signals according to a first parameter of the one or more parameters based at least in part on a first channel quality metric associated with the first set of reference signals, wherein the measurement periodicity for the first set of reference signals is separately adjustable relative to a measurement periodicity for the second set of reference signals.

Aspect 2: The method of aspect 1, wherein the channel quality metrics comprise SINR ratios, and wherein adjusting the measurement periodicity for the first set of reference signals comprises: adjusting a time gap between successive measurements for the first set of reference signals based at least in part on a first SINR ratio associated with the first set of reference signals exceeding a first threshold.

Aspect 3: The method of aspect 2, wherein the control message indicates the first threshold associated with the first set of reference signals and a second threshold associated with the second set of reference signals.

Aspect 4: The method of aspect 3, wherein the first threshold and the second threshold are the same based at least in part on the first TRP and the second TRP being associated with the cell.

Aspect 5: The method of aspect 3, wherein the first threshold and the second threshold are different based at least in part on the first TRP being associated with the first set of reference signals and the second TRP being associated with the second set of reference signals.

Aspect 6: The method of any of aspects 1 through 5, further comprising: maintaining the measurement periodicity for the second set of reference signals based at least in part on a second channel quality metric associated with the second set of reference signals failing to exceed a threshold.

Aspect 7: The method of aspect 6, wherein maintaining the measurement periodicity for the second set of reference signals is based at least in part on a SINR ratio associated with the second set of reference signals failing to exceed a threshold, and the second channel quality metric is the SINR ratio.

Aspect 8: The method of any of aspects 1 through 5, further comprising: adjusting the measurement periodicity for the second set of reference signals according to a second parameter of the one or more parameters based at least in part on a second channel quality metric associated with the second set of reference signals.

Aspect 9: The method of aspect 8, wherein the first parameter and the second parameter are the same based at least in part on the first TRP and the second TRP being associated with the cell.

Aspect 10: The method of aspect 8, wherein the first parameter and the second parameter are different based at least in part on the first TRP being associated with the first set of reference signals and the second TRP being associated with the second set of reference signals.

Aspect 11: The method of any of aspects 8 through 10, wherein adjusting the measurement periodicity for the second set of reference signals is based at least in part on a SINR ratio associated with the second set of reference signals exceeding a threshold, and the second channel quality metric is the SINR ratio.

Aspect 12: The method of any of aspects 1 through 11, further comprising: transmitting a report indicating the adjustment of the measurement periodicity for the first set of reference signals, wherein the report comprises an indication of a first CORESET identifier associated with the first TRP of the cell.

Aspect 13: The method of aspect 12, wherein the report further indicates an adjustment of the measurement periodicity for the second set of reference signals, and the report comprises an indication of a second CORESET identifier associated with the second TRP of the cell.

Aspect 14: The method of any of aspects 12 through 13, wherein the report is transmitted via UE assistance information.

Aspect 15: The method of any of aspects 1 through 14, further comprising: determining a mobility metric associated with the UE, wherein adjusting the measurement periodicity for the first set of reference signals is based at least in part on the mobility metric associated with the UE being associated with a low mobility scenario.

Aspect 16: The method of aspect 15, wherein the mobility metric is associated with the first TRP and the second TRP based at least in part on the first TRP and the second TRP being associated with the cell.

Aspect 17: The method of any of aspects 1 through 16, further comprising: receiving a second control message indicative of a plurality of CORESET identifiers, wherein each CORESET identifier is associated with a respective TRP of the cell.

Aspect 18: The method of any of aspects 1 through 17, wherein adjusting the measurement periodicity for the first set of reference signals comprises increasing a time gap between successive measurements of the first set of reference signals based at least in part on the first parameter.

Aspect 19: A method for wireless communications at a network entity, comprising: transmitting a first control message indicative of a plurality of CORESET identifiers, wherein each CORESET identifier is associated with a respective TRP of a cell; transmitting a second control message indicative of one or more parameters associated with adjusting one or more measurement periodicities associated with measurements of a plurality of reference signals by a UE, wherein the plurality of reference signals comprises a first set of reference signals associated with a first TRP of the cell and a second set of reference signals associated with a second TRP of the cell; and receiving a report indicative of an adjustment, by the UE, of a measurement periodicity for the first set of reference signals according to a first parameter of the one or more parameters, wherein the measurement periodicity for the first set of reference signals is separately adjustable relative to a measurement periodicity for the second set of reference signals.

Aspect 20: The method of aspect 19, wherein first control message indicates one or more thresholds associated with channel quality metrics for the plurality of reference signals, including a first threshold associated with the first set of reference signals and a second channel quality threshold associated with the second set of reference signals.

Aspect 21: The method of aspect 20, wherein the first threshold and the second threshold are the same based at least in part on the first TRP and the second TRP being associated with the cell.

Aspect 22: The method of aspect 20, wherein the first threshold and the second threshold are different based at least in part on the first TRP being associated with the first set of reference signals and the second TRP being associated with the second set of reference signals.

Aspect 23: The method of any of aspects 19 through 22, wherein the report comprises an indication of a CORESET identifier of the plurality of CORESET identifiers, and the CORESET identifier is associated with the first TRP of the cell.

Aspect 24: The method of any of aspects 19 through 23, wherein the report further indicates an adjustment, by the UE, of the measurement periodicity for the second set of reference signals according to a second parameter of the one or more parameters, and the report comprises an indication of a CORESET identifier associated with the second TRP of the cell.

Aspect 25: The method of aspect 24, wherein the first parameter and the second parameter are the same based at least in part on the first TRP and the second TRP being associated with the cell.

Aspect 26: The method of aspect 24, wherein the first parameter and the second parameter are different based at least in part on the first TRP being associated with the first set of reference signals and the second TRP being associated with the second set of reference signals.

Aspect 27: The method of any of aspects 19 through 26, wherein the report is received via UE assistance information.

Aspect 28: An apparatus for wireless communications at a UE, comprising a processor; a transceiver; and at least one processor coupled with the memory and the transceiver, the at least one processor configured to cause the apparatus to perform a method of any of aspects 1 through 18.

Aspect 29: An apparatus for wireless communications at a UE, comprising at least one means for performing a method of any of aspects 1 through 18.

Aspect 30: A non-transitory computer-readable medium storing code for wireless communications at a UE, the code comprising instructions executable by a processor to perform a method of any of aspects 1 through 18.

Aspect 31: An apparatus for wireless communications at a network entity, comprising a processor; and at least one processor coupled with the memory, the at least one processor configured to cause the apparatus to perform a method of any of aspects 19 through 27.

Aspect 32: An apparatus for wireless communications at a network entity, comprising at least one means for performing a method of any of aspects 19 through 27.

Aspect 33: A non-transitory computer-readable medium storing code for wireless communications at a network entity, the code comprising instructions executable by a processor to perform a method of any of aspects 19 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   memory;
   a transceiver; and
   at least one processor of a user equipment (UE), the at least one processor coupled with the memory and the transceiver and configured to cause the apparatus to:
   receive, via the transceiver, a control message indicative of one or more parameters associated with measuring a plurality of reference signals, wherein the one or more parameters are associated with adjusting one or more measurement periodicities associated with the plurality of reference signals;
   measure respective channel quality metrics for the plurality of reference signals, wherein the plurality of reference signals comprises a first set of reference signals associated with a first transmission reception point of a cell and a second set of reference signals associated with a second transmission reception point of the cell; and
   adjust a measurement periodicity for the first set of reference signals according to a first parameter of the one or more parameters based at least in part on a first channel quality metric associated with the first set of reference signals, wherein the measurement periodicity for the first set of reference signals is separately adjustable relative to a measurement periodicity for the second set of reference signals.

2. The apparatus of claim 1, wherein, to adjust the measurement periodicity for the first set of reference signals, the processor is configured to cause the apparatus to:
   adjust a time gap between successive measurements for the first set of reference signals based at least in part on a first signal to interference and noise ratio associated with the first set of reference signals exceeding a first threshold.

3. The apparatus of claim 2, wherein the control message indicates the first threshold associated with the first set of reference signals and a second threshold associated with the second set of reference signals.

4. The apparatus of claim 3, wherein the first threshold and the second threshold are the same based at least in part on the first transmission reception point and the second transmission reception point being associated with the cell or are different based at least in part on the first transmission reception point being associated with the first set of reference signals and the second transmission reception point being associated with the second set of reference signals.

5. The apparatus of claim 1, the at least one processor further configured to cause the apparatus to:
   maintain the measurement periodicity for the second set of reference signals based at least in part on a second channel quality metric associated with the second set of reference signals.

6. The apparatus of claim 5, wherein the at least one processor is configured to cause the apparatus to maintain the measurement periodicity for the second set of reference signals based at least in part on a signal to interference and noise ratio associated with the second set of reference signals failing to exceed a threshold, and wherein the second channel quality metric is the signal to interference and noise ratio.

7. The apparatus of claim 1, the at least one processor further configured to cause the apparatus to:
   adjust the measurement periodicity for the second set of reference signals according to a second parameter of the one or more parameters based at least in part on a second channel quality metric associated with the second set of reference signals.

8. The apparatus of claim 7, wherein the first parameter and the second parameter are the same based at least in part on the first transmission reception point and the second transmission reception point being associated with the cell or are different based at least in part on the first transmission reception point being associated with the first set of reference signals and the second transmission reception point being associated with the second set of reference signals.

9. The apparatus of claim 7, wherein the at least one processor is configured to cause the apparatus to adjust the measurement periodicity for the second set of reference signals based at least in part on a signal to interference and noise ratio associated with the second set of reference signals exceeding a threshold, and wherein the second channel quality metric is the signal to interference and noise ratio.

10. The apparatus of claim 1, the at least one processor further configured to cause the apparatus to:
transmit, via the transceiver, a report indicating the adjustment of the measurement periodicity for the first set of reference signals, wherein the report comprises an indication of a first control resource set identifier associated with the first transmission reception point of the cell.

11. The apparatus of claim 10, wherein the report further indicates an adjustment of the measurement periodicity for the second set of reference signals, and wherein the report comprises an indication of a second control resource set identifier associated with the second transmission reception point of the cell.

12. The apparatus of claim 1, the at least one processor further configured to cause the apparatus to:
determine a mobility metric associated with the UE, wherein adjusting the measurement periodicity for the first set of reference signals is based at least in part on the mobility metric associated with the UE being associated with a low mobility scenario.

13. The apparatus of claim 1, the at least one processor further configured to cause the apparatus to:
receive, via the transceiver, a second control message indicative of a plurality of control resource set identifiers, wherein each control resource set identifier is associated with a respective transmission reception point of the cell.

14. An apparatus for wireless communications at a wireless device, comprising:
memory; and
at least one processor of a network entity, the at least one processor coupled with the memory and configured to cause the apparatus to:
transmit a first control message indicative of a plurality of control resource set identifiers, wherein each control resource set identifier is associated with a respective transmission reception point of a cell;
transmit a second control message indicative of one or more parameters associated with adjusting one or more measurement periodicities associated with measurements of a plurality of reference signals by a user equipment (UE), wherein the plurality of reference signals comprises a first set of reference signals associated with a first transmission reception point of the cell and a second set of reference signals associated with a second transmission reception point of the cell; and
receive a report indicative of an adjustment, by the UE, of a measurement periodicity for the first set of reference signals according to a first parameter of the one or more parameters, wherein the measurement periodicity for the first set of reference signals is separately adjustable relative to a measurement periodicity for the second set of reference signals.

15. The apparatus of claim 14, wherein first control message indicates one or more thresholds associated with channel quality metrics for the plurality of reference signals, including a first threshold associated with the first set of reference signals and a second threshold associated with the second set of reference signals.

16. The apparatus of claim 15, wherein the first threshold and the second threshold are the same based at least in part on the first transmission reception point and the second transmission reception point being associated with the cell or are different based at least in part on the first transmission reception point being associated with the first set of reference signals and the second transmission reception point being associated with the second set of reference signals.

17. The apparatus of claim 14, wherein the report comprises an indication of a first control resource set identifier of the plurality of control resource set identifiers, and wherein the first control resource set identifier is associated with the first transmission reception point of the cell.

18. The apparatus of claim 14, wherein the report further indicates an adjustment, by the UE, of the measurement periodicity for the second set of reference signals according to a second parameter of the one or more parameters, and wherein the report comprises an indication of a second control resource set identifier associated with the second transmission reception point of the cell.

19. The apparatus of claim 18, wherein the first parameter and the second parameter are the same based at least in part on the first transmission reception point and the second transmission reception point being associated with the cell or are different based at least in part on the first transmission reception point being associated with the first set of reference signals and the second transmission reception point being associated with the second set of reference signals.

20. A method for wireless communications at a user equipment (UE), comprising:
receiving a control message indicative of one or more parameters associated with measuring a plurality of reference signals, wherein the one or more parameters are associated with adjusting one or more measurement periodicities associated with the plurality of reference signals;
measuring respective channel quality metrics for the plurality of reference signals, wherein the plurality of reference signals comprises a first set of reference signals associated with a first transmission reception point of a cell and a second set of reference signals associated with a second transmission reception point of the cell; and
adjusting a measurement periodicity for the first set of reference signals according to a first parameter of the one or more parameters based at least in part on a first channel quality metric associated with the first set of reference signals, wherein the measurement periodicity for the first set of reference signals is separately adjustable relative to a measurement periodicity for the second set of reference signals.

* * * * *